(12) United States Patent
Sakaguchi et al.

(10) Patent No.: US 10,336,337 B2
(45) Date of Patent: Jul. 2, 2019

(54) VEHICLE DRIVE SYSTEM

(71) Applicant: HONDA MOTOR CO., LTD., Tokyo (JP)

(72) Inventors: Yusuke Sakaguchi, Wako (JP); Masatoshi Noguchi, Wako (JP); Satoshi Ando, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 15/474,028

(22) Filed: Mar. 30, 2017

(65) Prior Publication Data

US 2017/0282929 A1 Oct. 5, 2017

(30) Foreign Application Priority Data

Mar. 31, 2016 (JP) ................. 2016-072179

(51) Int. Cl.
| | |
|---|---|
| *B60W 30/18* | (2012.01) |
| *B60K 17/348* | (2006.01) |
| *B60K 28/16* | (2006.01) |
| *B60W 10/06* | (2006.01) |
| *B60W 10/08* | (2006.01) |

(Continued)

(52) U.S. Cl.
CPC ..... *B60W 30/18172* (2013.01); *B60K 17/348* (2013.01); *B60K 28/16* (2013.01); *B60W 10/06* (2013.01); *B60W 10/08* (2013.01); *B60W 20/00* (2013.01); *B60W 20/10* (2013.01); *B60W 30/02* (2013.01); *B60K 1/02* (2013.01); *B60K 7/0007* (2013.01); *B60K 17/046* (2013.01); *B60W 2050/0004* (2013.01); *B60W 2520/125* (2013.01); *B60W 2520/26* (2013.01); *Y02T 10/6286* (2013.01); *Y02T 10/7258* (2013.01)

(58) Field of Classification Search
CPC ................. B60W 30/18172; B60K 28/16
See application file for complete search history.

(56) References Cited

U.S. PATENT DOCUMENTS

| | | | |
|---|---|---|---|
| 9,002,562 B2* | 4/2015 | Andou | B60K 6/48 180/65.265 |
| 9,969,400 B2* | 5/2018 | Sakaguchi | B60K 17/348 |

(Continued)

FOREIGN PATENT DOCUMENTS

JP 2008-120119 A 5/2008

*Primary Examiner* — Kevin Hurley
(74) *Attorney, Agent, or Firm* — Westerman, Hattori, Daniels & Adrian, LLP

(57) ABSTRACT

A vehicle drive system includes a slip acquisition unit that acquires occurrence of excessive slip, an addition slip point calculating unit that calculates addition slip points in a time-discrete manner, based on having acquired that the excessive slip has occurred, a cumulative slip point calculating unit that accumulates the addition slip points and calculates a cumulative slip point over time, a drive state switching unit that switches between 2WD and AWD based on cumulative slip points and a drive state switching threshold value, and a cumulative slip point resetting unit triggered by a lateral acceleration correlation value of the vehicle reaching a lateral acceleration threshold value or higher, or a drive force correlation value of the drive wheels reaching a drive force correlation threshold value or higher, to reset the cumulative slip point to a value smaller than the drive state switching threshold value.

9 Claims, 18 Drawing Sheets

(51) Int. Cl.
  *B60W 20/00* (2016.01)
  *B60W 30/02* (2012.01)
  *B60W 20/10* (2016.01)
  *B60W 50/00* (2006.01)
  *B60K 1/02* (2006.01)
  *B60K 7/00* (2006.01)
  *B60K 17/04* (2006.01)

(56) References Cited

U.S. PATENT DOCUMENTS

2005/0103549 A1* 5/2005 Matsuda .................. B60K 6/44
  180/243
2005/0278104 A1* 12/2005 Masuda .................... B60K 6/44
  701/69
2014/0121870 A1* 5/2014 Lee ........................ B60W 20/10
  701/22
2016/0288792 A1* 10/2016 Ando ....................... B60K 6/44

* cited by examiner

VEHICLE DRIVE SYSTEM

CROSS REFERENCES TO RELATED APPLICATIONS

The present application claims priority under 35 U.S.C. § 119 to Japanese Patent Application No. 2016-072179, filed Mar. 31, 2016, entitled "Vehicle Drive System." The contents of this application are incorporated herein by reference in their entirety.

BACKGROUND

1. Field

The present disclosure relates to a vehicle drive system, and more particularly relates to a vehicle drive system that switches the drive state of a vehicle when slipping is occurring and after slipping has occurred.

2. Description of the Related Art

There has been conventionally proposed a technology where, when front wheels or rear wheels of a vehicle slip, a two-wheel drive state (hereinafter referred to as "2WD") is switched to a four-wheel drive state (hereinafter referred to as "AWD"), and AWD is continued while a preset four-wheel drive continuing time elapses from the point that the slipping state has been resolved (e.g., see Japanese Unexamined Patent Application Publication No. 2008-120119). This Japanese Unexamined Patent Application Publication No. 2008-120119 disclose technology where not only is AWD continued until the preset four-wheel drive continuing time elapse in this way, but also a corrected four-wheel drive continuing time is calculated where the value of the four-wheel drive continuing time is variable in accordance with the amount of slip (magnitude and degree of slipping), and AWD is continued until the calculated four-wheel drive corrected continuing time elapses.

However, even if the calculated slip amount is the same, road conditions will greatly vary from time to time. Accordingly, there is a possibility that the amount of time over which to continue AWD cannot be appropriately set in a system where the four-wheel drive continuing time is decided beforehand without taking road conditions into consideration, or a system where the four-wheel drive corrected continuing time is decided simply based on slip amount without taking road conditions into consideration.

Accordingly, there has been concern that vehicle stability might be at risk due to uniformly switching from AWD to 2WD based on four-wheel drive corrected continuing time or the like, regardless of a situation where the friction coefficient (μ) of the road surface is low and AWD should be continued. On the other hand, needlessly continuing AWD for extended periods of time based on four-wheel drive corrected continuing time or the like, regardless of a situation where the friction coefficient of the road surface is high and continuing AWD is needless, may result in poor fuel consumption or electricity consumption (hereinafter referred to as "drive efficiency").

It has been found to be desirable to provide a vehicle drive system that can improve drive efficiency while securing vehicle stability, by switching between drive states of the vehicle at a more appropriate timing.

SUMMARY

The present application describes a vehicle drive system (e.g., a later-described vehicle drive system) including first drive device (e.g., later-described first drive device) that drives first drive wheel(s) that are one of front wheel(s) (e.g., later-described front wheels) and rear wheel(s) (e.g., later described rear wheels) of a vehicle (e.g., later-described vehicle), second drive device (e.g., later-described second drive device) that drives second drive wheel(s) that are the other of front wheel(s) and rear wheel(s) of the vehicle, and a control device (e.g., later-described ECU) that controls the first drive device and the second drive device, and controls a drive state of the first drive wheels and the second drive wheels. Hereinafter, as an exemplary embodiment for an in part-wheel drive state, a case of 2WD where a front-two or rear-two wheel drive state is explained, although there is no intention to limit the invention to the case of 2WD.

The control device of the vehicle drive system Includes a slip acquisition unit (e.g., later-described slip acquisition unit) that acquires that an excessive slip, which is slipping of the first drive wheels or the second drive wheels by a predetermined amount or more, is occurring, an addition slip point calculating unit (e.g., later-described addition slip point calculating unit) that calculates addition slip points in a time-discrete manner, based on the slip acquisition unit having acquired that the excessive slip has occurred, a cumulative slip point calculating unit (cumulative slip point calculating unit) that accumulates the addition slip points and calculates a cumulative slip point over time, a drive state switching unit (e.g., later-described drive state switching unit) that, in a case where the cumulative slip point is smaller than a drive state switching threshold value, realizes an in-part-wheel drive state such as a two-wheel drive state (2WD) where the vehicle is driven by only one of the first drive wheels and the second drive wheels (hereinafter, as an exemplary embodiment, a case of 2WD where a front-two or rear-two wheel drive state is explained, although there is no intention to limit the invention to the case of 2WD), and in a case where the cumulative slip point is equal to or greater than the drive state switching threshold value, realizes an all-wheel drive state (AWD) where the vehicle is driven by both the first drive wheels and the second drive wheels, and a cumulative slip point resetting unit (e.g., later-described cumulative slip point resetting unit) that, in a state where the drive state of the vehicle has been switched to the all-wheel drive state by the drive state switching unit, is triggered by a lateral acceleration correlation value (e.g., a value of lateral acceleration measured by a later-described lateral G sensor, a value calculated by a later-described Expression (1) or a later-described Expression (2)) having correlation to lateral acceleration of the vehicle reaching a lateral acceleration threshold value or higher, or a drive force correlation value (e.g., later-described four-wheel drive force, two-wheel drive force of the rear wheels driven by the second drive device, drive force requested by the driver that is calculated based on accelerator operations by the driver) having correlation to drive force of the drive wheels reaching a drive force correlation threshold value or higher, to reset the cumulative slip point to a value smaller than the drive state switching threshold value (e.g., zero).

According to the present disclosure, addition slip points are calculated based on the slip acquisition unit. Switching is performed between 2WD and AWD based on cumulative slip points that are the accumulated value of the calculated addition slip points.

Also, in a case of having switched to AWD in this way, the cumulative slip points are reset to be smaller than the drive state switching threshold value in the present embodiment, based on lateral acceleration correlation values having correlation with lateral acceleration of the vehicle or drive force correlation values having correlation with drive force of the drive wheels.

With regard to this point, if drive force correlation values such as lateral acceleration correlation values of lateral Gs or the like, or four-wheel drive force or the like, are high, there is a high likelihood that the road is paved, the road surface is dry, and so forth. According to the present embodiment, the cumulative slip points are reset to be smaller than the drive state switching threshold value in such a case, so that switching to 2WD is more readily performed. Thus, a situation where AWD is needlessly continued for a long time even though the friction coefficient of the road is high and AWD is unnecessary, can be suppressed, thereby improving drive efficiency.

On the other hand, if drive force correlation values such as lateral acceleration, correlation values of lateral Gs or the like, or four-wheel drive force or the like, are low, there is a high likelihood that slipping is occurring with road conductions of low friction coefficient such as wet pavement or the like. According to the present embodiment, the cumulative slip points are not reset in such a case, so switching to 2WD is less readily performed. Thus, the drive state can be switched in accordance with the drive force of the drive wheel where slippage has occurred, so a situation where AWD is switched to 2WD even though the friction coefficient of the road is low and AWD is necessary, can be suppressed, thereby improving securing vehicle stability.

The cumulative slip point resetting unit may also reset the cumulative slip points to a value smaller than the drive state switching threshold value upon being triggered by just one or the other of a lateral acceleration correlation value having correlation to lateral acceleration of the vehicle reaching a lateral acceleration threshold value or higher, and a drive force correlation value having correlation to drive force of the drive wheels reaching a drive force correlation threshold value or higher.

In this case, the control device preferably further includes a subtraction slip point calculating unit (e.g., later-described subtraction slip point calculating unit 69) that calculates subtraction slip points in a time-discrete manner, based on the slip acquisition unit having not acquired that an excessive slip has occurred, the cumulative slip point calculating unit accumulating the subtraction slip points in addition to the addition slip points.

Subtraction slip points are calculated in a time-discrete manner, based on the slip acquisition unit having not acquired that an excessive slip has occurred, and subtraction slip points are accumulated in addition to addition slip points. Accordingly, in a case where the cumulative slip points exceed the drive state switching threshold value and thereafter are smaller than drive state switching threshold value, the drive state is switched to 2WD. Thus, traveling continues in AWD until configuration can be made that the excessive slipping has ended. In a case where elapse of a certain amount of time from an excessive slip having occurred triggers switching from AWD to 2WD, the drive state is switched from AWD to 2WD even if in the middle of an excessive slip, but occurrence of such problems can be avoided by the present disclosure.

In this case, the vehicle drive system preferably further includes a first determination unit (e.g., later-described first stable traveling determination unit) that, in a case where the cumulative slip point reaches the drive state switching threshold value or higher and thereafter the cumulative slip point becomes smaller than the drive state switching threshold value due to the subtraction slip points having been accumulated, determines whether or not first conditions (e.g., conditions in later-described first stable traveling determination), which are conditions for the drive state switching unit to realize the two-wheel drive state, have been satisfied, and a second determination unit (e.g., later-described second stable traveling determination unit) that, in a case where the cumulative slip point reaches the drive state switching threshold value or higher and thereafter the cumulative slip point becomes smaller than the drive state switching threshold value due to resetting by the cumulative slip point resetting unit, determines whether or not second conditions (e.g., conditions in later-described second stable traveling determination), which are conditions for the drive state switching unit to realize the two-wheel drive state and are more readily satisfied than the first conditions, have been satisfied. The drive state switching unit realizes a two-wheel drive state in a case where the cumulative slip point is smaller than the drive state switching threshold value and the first conditions or second conditions are satisfied.

Two conditions are used in the present disclosure, instead of switching to 2WD under certain conditions based on cumulative slip points as in a conventional arrangement, so the drive state of the vehicle 3 can be switched at a more appropriate timing. Second conditions for a case where the cumulative slip point resetting unit performs a reset, since there is a high likelihood that the friction coefficient of the road surface is high, are more readily satisfied. Accordingly, conditions are more readily satisfied, so the conditions are more readily satisfied in a state where the friction coefficient of the road surface is high and AWD is unnecessary, so a situation where AWD is needlessly continued for a long time can be suppressed, and drive efficiency can be improved.

In this case, the first determination unit and the second determination unit preferably perform settings where the number of determination items for determination to be made that the second conditions are satisfied is smaller than the number of determination items for determination to be made that the first conditions are satisfied.

The number of determination items can be made to differ among the conditions in the present disclosure. The fewer the number of determination items for determination to be made that the conditions are satisfied is, the easier it is to satisfy the conditions. Second conditions for a case where the cumulative slip point resetting unit performs a reset, since there is a high likelihood that the friction coefficient of the road surface is high, are more readily satisfied. Accordingly, conditions are more readily satisfied, so the conditions are more, readily satisfied in a state where the friction coefficient of the road surface is high and AWD is unnecessary, so a situation where AWD is needlessly continued for a long time can be suppressed, and drive efficiency can be improved.

In this case, the first determination unit and the second determination unit preferably perform settings where the number of determination items for determination to be made that the second conditions are satisfied (e.g., the three of later-described steering wheel angular speed, lateral G, and fore-aft G) is smaller than the number of determination items for determination to be made that the first conditions are satisfied (e.g., the five of later-described steering wheel angular speed, yaw rate G, lateral G, vehicle speed, and fore-aft G).

The number of determination items to determine that the second conditions have been satisfied is less than the number of determination items to determine that the first conditions have been satisfied in the present disclosure. The fewer the number of determination items for the conditions to be satisfied is, the easier it is to satisfy the conditions. Thus, second conditions for a case where the cumulative slip point resetting unit performs a reset, since there is a high likelihood that the friction coefficient of the road surface is high, are more readily satisfied. Accordingly, conditions are more readily satisfied, so the conditions are more readily satisfied in a state where the friction coefficient of the road surface is high and AWD is unnecessary, so a situation where AWD is needlessly continued for a long time can be suppressed, and drive efficiency can be improved.

In this case, the first determination unit and the second determination unit may perform settings where a threshold value of a determination item for determination that conditions have been satisfied in a case where a value is the threshold value or higher is set where the threshold value for the first conditions is higher than the threshold value for the second conditions, and a threshold value for of a determination item determination that conditions have been satisfied in a case where a value is smaller than the threshold value is set where the threshold value for the first conditions is lower than the threshold value for the second conditions.

Thus, in the present disclosure, the threshold value of a determination item for determination that conditions have been satisfied in a case where a value is the threshold value or higher is set where the threshold value for the first conditions is higher than the threshold value for the second conditions, and the threshold value for of a determination item determination that conditions have been satisfied in a case where a value is smaller than the threshold value is set where the threshold value for the first conditions is lower than the threshold value for the second conditions. Accordingly, the threshold values can be changed for the same determination item among the first conditions and second conditions, so the second conditions can be conditions that are more readily satisfied than the first conditions.

In this case, when the slip acquisition unit acquires that the excessive slip has occurred, the addition slip point calculating unit preferably calculates the addition slip points based on a drive force correlation value having correlation with drive force of the drive wheel where the excessive slip has occurred.

In the present disclosure, the addition slip points are calculated based on a drive force correlation value having correlation with drive force of the drive wheel where the excessive slip has occurred. Accordingly, the drive state is not simply switched in accordance with the accumulated value of slip amount as in conventional arrangements, but rather switches the drive state based on the drive force of the drive wheel where the slippage has occurred, so the drive state of the vehicle can be switched at a more suitable timing.

In this case, the cumulative slip point resetting unit preferably performs the resetting not over time but instantaneously.

In the present disclosure, the cumulative slip point resetting unit preferably performs the resetting of the cumulative slip points to a value smaller than the drive state switching threshold value, not over time but instantaneously. Accordingly, the cumulative slip points can be immediately reset and facilitate switching to 2WD, as compared with a case where subtraction slip points are accumulated over time. Accordingly, a situation where AWD is needlessly continued for a long time even though the friction coefficient of the road is high and AWD is unnecessary, can be suppressed, even further improving drive efficiency.

Thus, according to the present disclosure, a vehicle drive system can be provided where drive efficiency is improved while securing vehicle stability, by switching the drive state of the vehicle at a more appropriate timing. The word "unit" used in this application may mean a physical part or component of computer hardware or any device including a controller, a processor, a memory, etc., which is particularly configured to perform functions and steps disclosed in the application.

DESCRIPTION OF THE PREFERRED EMBODIMENTS

Figure 1:
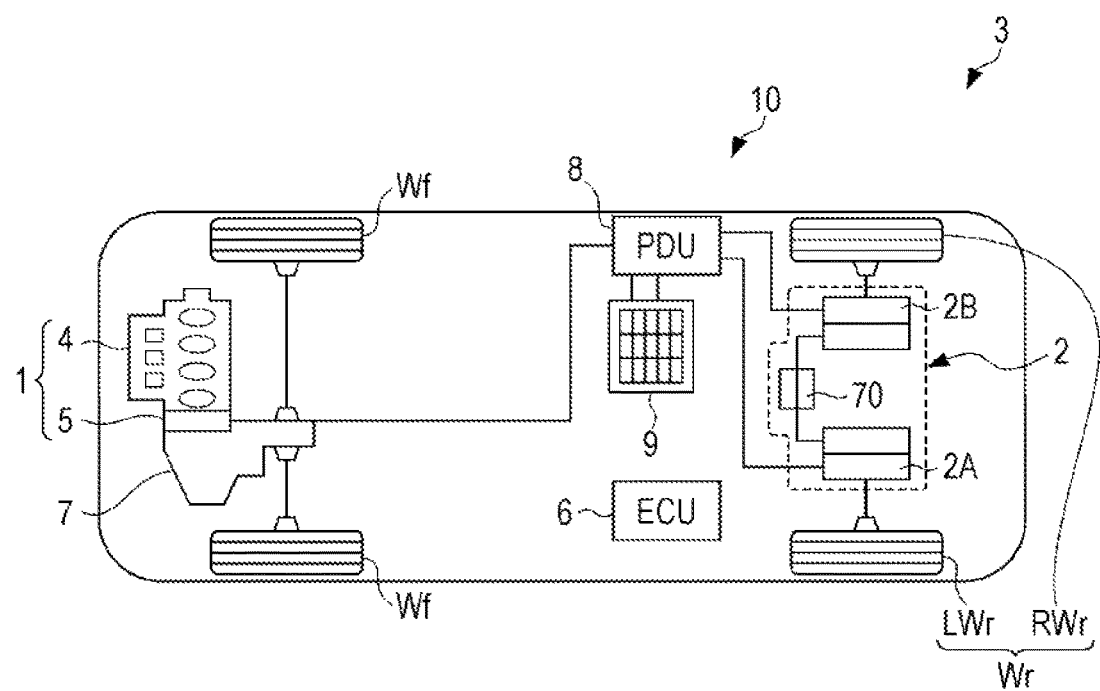
FIG. 1 is a diagram illustrating a vehicle in which is installed a vehicle drive system according to an embodiment.

Embodiments will be described in detail with reference to the drawings. Mote that configurations and steps in a second and subsequent embodiments that are the same with those in a first embodiment will be denoted by the same reference numerals, and description thereof will foe omitted.

First Embodiment

FIG. 1 is a diagram illustrating a vehicle in which is installed a vehicle drive system according to a first embodiment. A vehicle 3 in which is installed the vehicle drive system 10 according to the embodiment is a hybrid vehicle. The vehicle drive system 10 installed in the vehicle 3 includes a first drive device 1, a second drive device 2, an electronic control unit (hereinafter "ECU") 6 serving as a control device to control these drive devices, a power drive unit (PDU) 8, and a battery 9, as illustrated in FIG. 1.

The first drive device 1 is disposed toward the front of the vehicle 3, and drives front wheels Wf which are first drive wheels. The first drive device 1 has an internal combustion engine (ENG) 4, an electric motor 5, and a transmission 7. The internal combustion engine 4 and the electric motor 5 are connected serially, with the torque from the internal combustion engine 4 and electric motor 5 being transmitted to the front wheels Wf via the transmission 7.

The internal combustion engine 4 is an inline four-cylinder engine for example, that generates torque to drive the vehicle 3 by burning fuel. The crankshaft of the internal combustion engine 4 is linked to the output shaft of the electric motor 5.

The electric motor 5 is a three-phase AC motor for example, that generates torque to drive the vehicle 3 by electric power stored in the battery 9. The electric motor 5 is connected to the battery 9 via the PDU 8 that has an inverter, and assists the drive force of the internal combustion engine 4.

The transmission 7 converts the torque generated at the internal combustion engine 4 into revolutions and torque at a desired transmission gear ratio, and transmits to the front wheels Wf.

The second drive device 2 is disposed toward the rear of the vehicle 3, and drives rear wheels Wr (RWr and LWr) serving as second drive wheels. The second drive device 2 includes electric motors 2A and 2B, and a motor traction control system (M-TCS) 70. The torque of the electric motors 2A and 2B is transmitted to the rear wheels Wr (RWr and LWr).

The electric motors 2A and 2B are three-phase AC motors for example, in the same way as the electric motor 5, and generate torque to drive the vehicle 3 by electric power stored in the battery 9. The electric motors 2A and 2B are also connected to the battery 9 via the PDU 8 that has an inverter, and electric power supply from the battery 9 and regeneration of energy to the battery 9 are controlled by control signals being input from the ECU 6 to the PDU 8.

The M-TCS 70 executes motor traction control for the second drive device 2. Specifically, the M-TCS 70 controls the rotation state of the rear wheels RWr and LWr by controlling torque generated by the electric motors 2A and 2B based on the wheel rotations of the rear wheels RWr and LWr and the motor rotations of the electric motors 2A and 2B, thereby preventing the rear wheels RWr and LWr from spinning.

Each of the front wheels Wf and rear wheels Wr (RWr and LWr), of which there are four in all, is provided with a friction brake omitted from illustration. The friction brakes are configured using hydraulic disk brakes, for example. When the driver steps of the brake pedal, the depressing force is transmitted to the brake pads having been amplified through a hydraulic cylinder and so forth, and frictional force is generated between the brake disk attached to each drive wheel and the brake pads, thereby braking the drive wheels.

The second drive device 2 will be described in further detail. Note that the second drive device 2 is described in detail in Japanese Unexamined Patent Application Publication No. 2010-235051 that has been applied for and disclosed by the Present Inventor, the entire contents of which are incorporated herein by reference.

Figure 2:
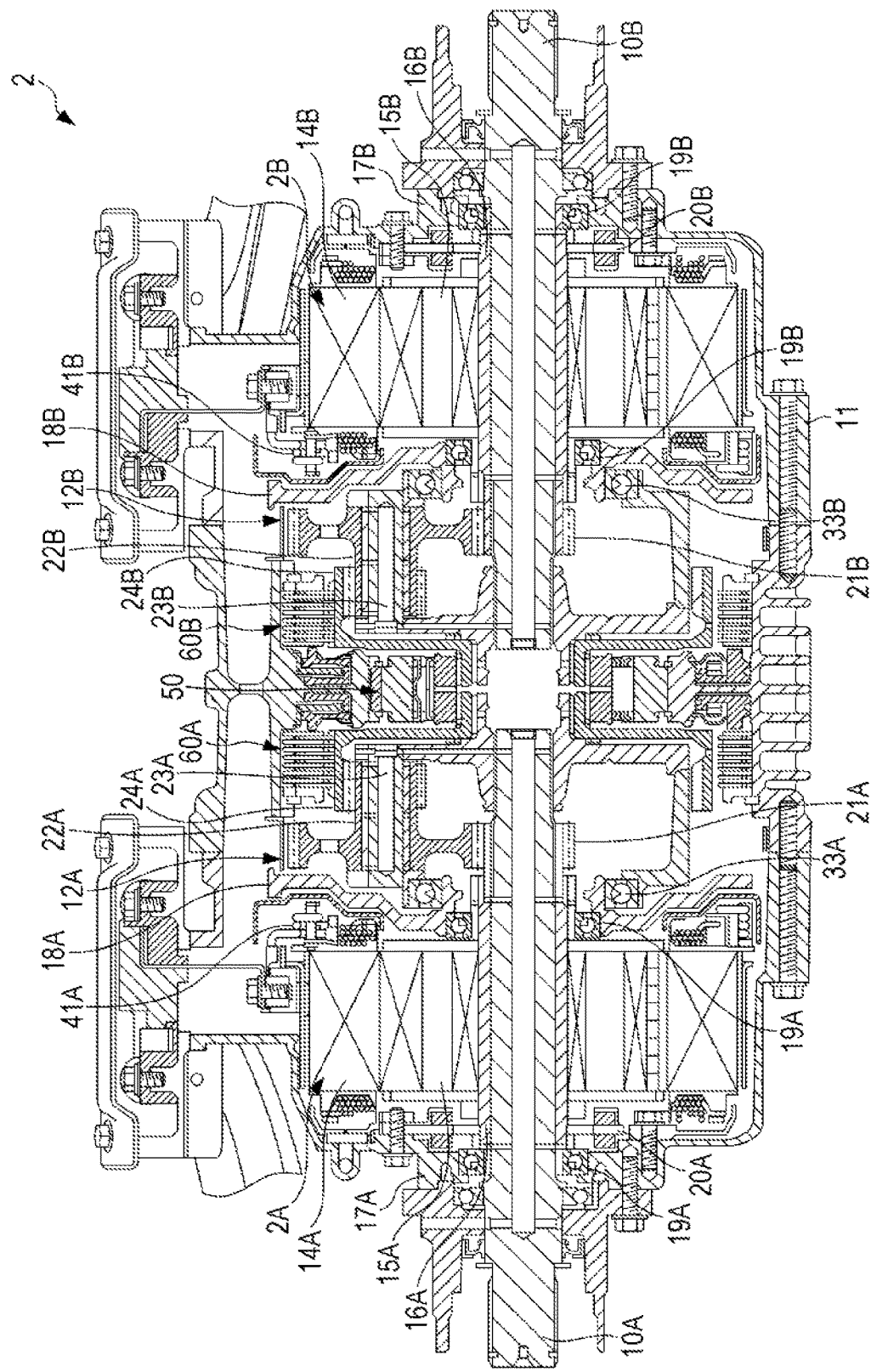
FIG. 2 is a longitudinal-sectional diagram of a second drive device according to the embodiment.
Figure 3:
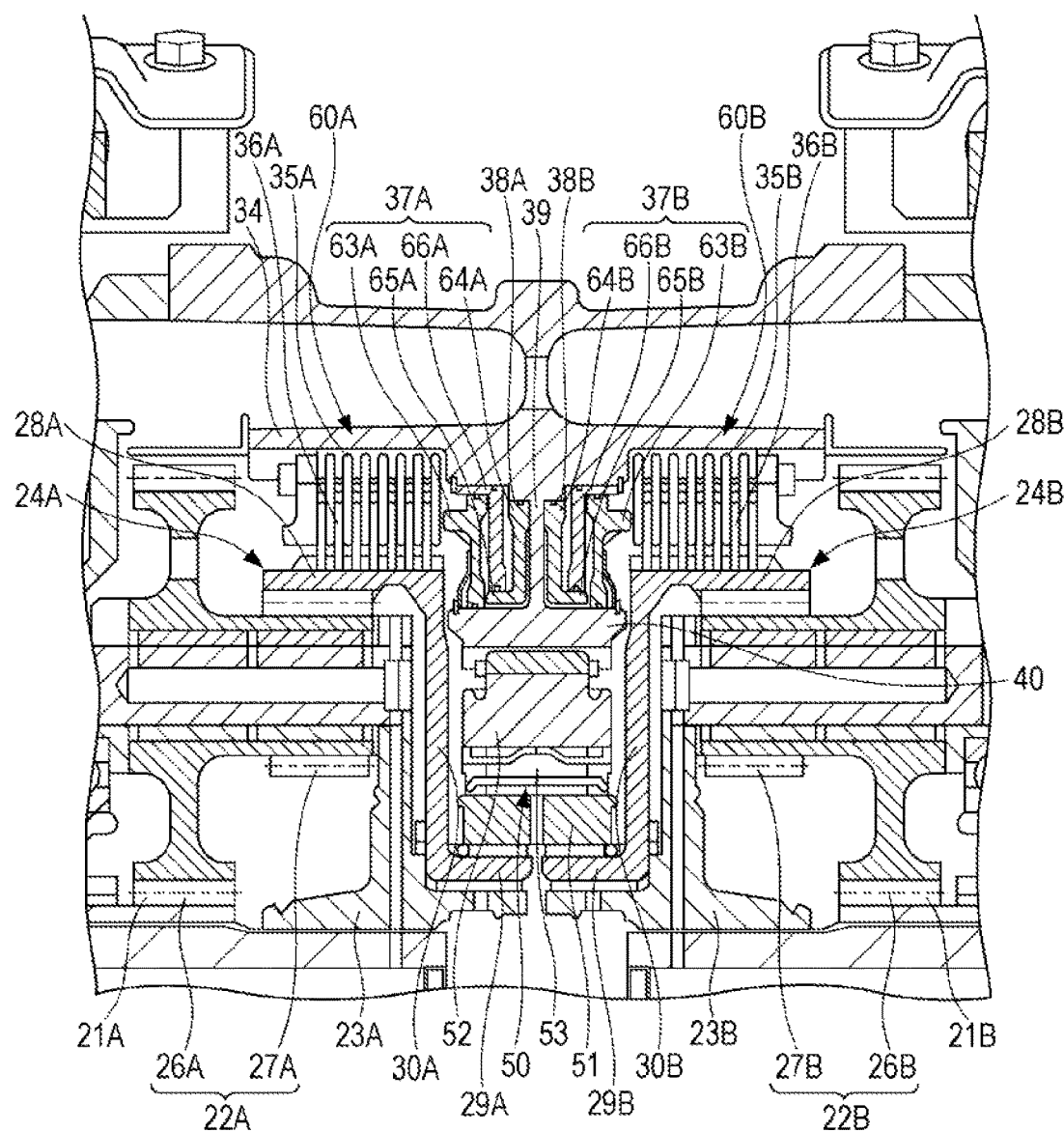
FIG. 3 is a partial enlarged view of the second drive device illustrated in FIG. 2.

FIG. 2 is a longitudinal-sectional view of the second drive device 2 according to the present embodiment. FIG. 3 is a partial enlarged view of the second drive device 2 illustrated in FIG. 2. The second drive device 2 has output shafts 10A and 10B that transmit drive force to the rear wheels RWr and LWr of the vehicle 3, and are disposed coaxiaiiy in the width direction of the vehicle, as illustrated in FIGS. 2 and 3. These output shafts 10A and 10B are connected to the axles of the rear wheels RWr and LWr Disposed inside a reducer case 11 are the electric motors 2A and 2B that device the output shafts 10A and 10B, and planetary gear reducers 12A and 12B that reduce drive rotations of the electric motors 2A and 2B, disposed coaxially with the output shafts 10A and 10B.

Stators 14A and 14B of the electric motors 2A and 2B are fixed on the inner portions of the left and right ends of the reducer case 11, and ring-shaped rotors 15A and 15B are rotatably disposed on there inner circumference side of the stators 14A and 14B. Cylindrical shafts 16A and 16B that surround the outer circumference of the output shafts 10A and 10B are joined to the inner circumferential portions of the rotors 15A and 15B, so that the cylindrical shafts 16A and 16B are supported so as to coaxial with the output shafts 10A and 10B and rotate relative thereto. Provided to end walls 17A and 17B of the reducer case 11 are resolvers 20A and 20B that detect rotational position information of the rotors 15A and 15B.

The planetary gear reducers 12A and 12B have sun gears 21A and 21B, multiple planetary gears 22A and 22B that mesh with the sun gears 21A and 21B, planetary carriers 23A and 23B that support these planetary gears 22A and 22B, and ring gears 24A and 24B that mesh with the outer side of the planetary gears 22A and 22B. Drive force of the electric motors 2A and 2B is input from the sun gears 21A and 21B, and the reduced drive force is output from the planetary carriers 23A and 23B. The aforementioned Japanese Unexamined Patent Application Publication No. 2010-235051 should be referenced for details of the planetary gear reducers 12A and 12B, the entire contents of which are incorporated herein by reference.

A cylindrical space portion is secured between the reducer case 11 and the ring gear 24A, with a hydraulic brake 60 that brakes the ring gears 24A and 24B being disposed within the space overlapping a second pinion 26A in the radial direction and overlapping a first pinion 27A in the axial direction. The hydraulic brake 60 has multiple fixed plates 35 spline-fit at the inner circumferential face of the reducer case 11, and multiple rotating plates 36 spline-fit on the outer circumferential face of the ring gear 24A, disposed alternately in the axial direction, with the plates 35 and 36 being engaged or released by a ring-shaped piston 37.

The piston 37 is accommodated in a ring-shaped cylinder chamber 38 formed between the reducer case 11 and a support wall 39 and a cylinder support portion 42, so as to be capable of advancing from and retracting to the cylinder chamber 38. The piston 37 is advanced by high-pressure oil being introduced into the cylinder chamber 38, and the piston 37 is retracted by discharging oil from the cylinder chamber 38. The hydraulic brake 60 is connected to an oil pump. The aforementioned Japanese Unexamined Patent Application Publication No. 2010-235051, the entire contents of which are incorporated herein by reference, should be referenced for details of the hydraulic brake 60 and piston 37.

A cylindrical space portion is also secured between the reducer case 11 and the ring gear 24B, with a one-way clutch 50 that transmits only power in one direction to the ring gears 24A and 24B and cuts off power in the other direction disposed within this space. The one-way clutch 50 is configured with a great number of sprags 53 interposed between an inner race 51 and an outer race 52, the inner race 51 being integrally formed with a gear portion 28B of the ring gear 24B. The outer race 52 is positioned by the inner face of the reducer case 11, and prevented from turning.

On the other hand, the one-way clutch 50 is configured to engage and lock rotation of the ring gears 24A and 24B when the vehicle 3 is traveling forward under the drive force of the electric motors 2A and 2B. More specifically, the one-way clutch 50 is configured to lock or disengage the ring gears 24A and 24B in the direction of torque acting on the ring gears 24A and 24B, and to lock rotation of the ring gears 24A and 24B in a case where torque in the opposite direction from the forward rotation direction of the sun gears 21A and 21B, when the vehicle 3 travels forward acts on the ring gears 24A and 24B.

The second drive device 2 configured in this way has the planetary gear reducers 12A and 12B facing each other in the axial direction at the middle portion, with the ring gear 24A of the planetary gear reducer 12A and the ring gear 24B of the planetary gear reducer 12B bing linked. The linked ring gears 24A and 24B are rotate supported by the cylinder support portion 42 of the reducer case 11 via a bearing 43. The hydraulic brake 60 is also disposed in space between the outer side of the planetary gear reducer 12A and the reducer case 11, and the one-way clutch 50 is disposed in space between the outer side of the planetary gear reducer 12B and the reducer case 11, with the piston 37 that operates the hydraulic brake 60 feeing disposed on the outer face of the bearing 34 between the hydraulic brake 60 and the one-way clutch 50.

Figure 4:
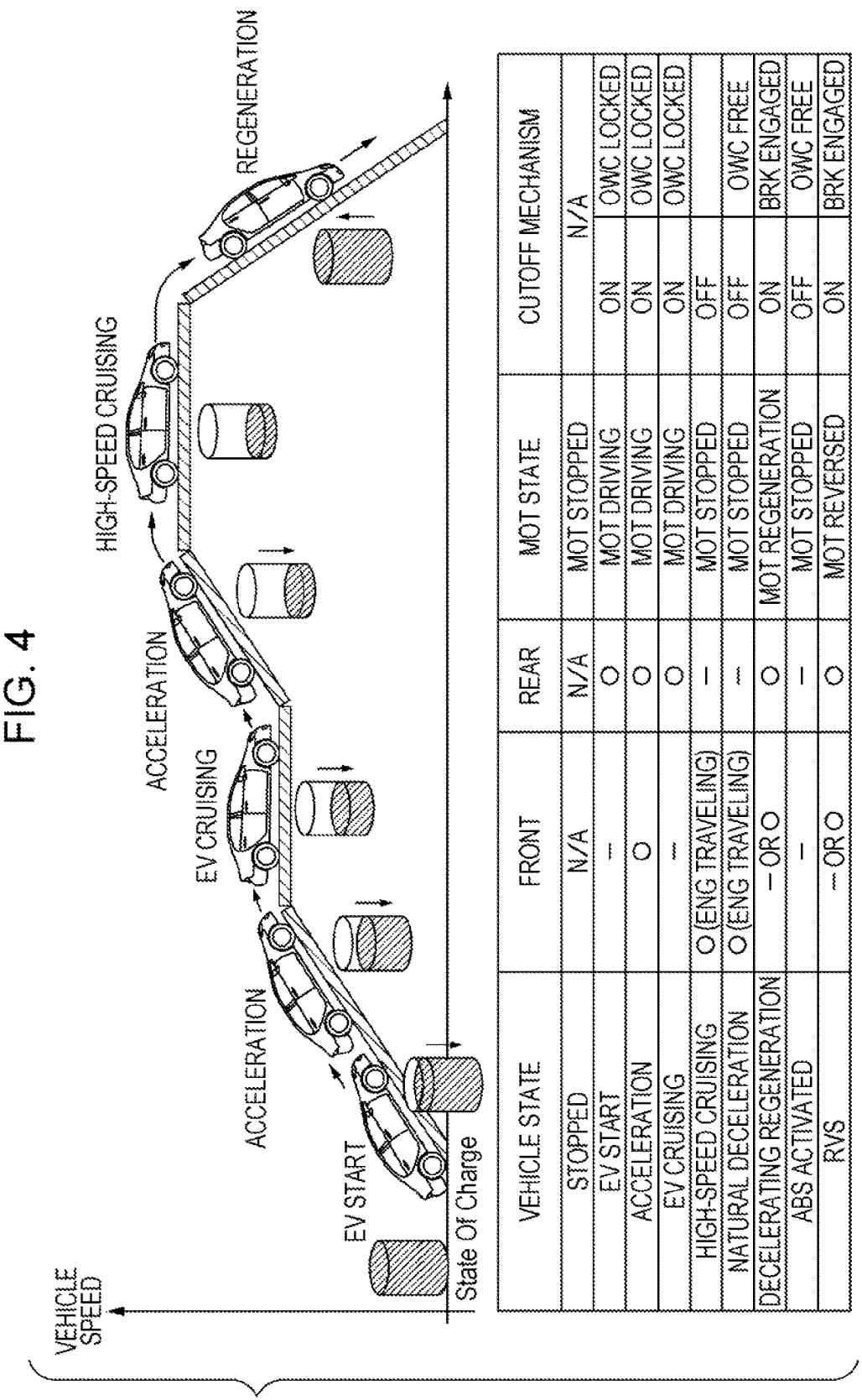
FIG. 4 is a diagram illustrating states of an electric motor and states of a cutoff mechanism, in a traveling state of a vehicle according to the embodiment.

Operations of the second drive device 2 that has the above-described configuration during normal traveling will be described. FIG. 4 is a diagram illustrating the state of the electric motors 2A and 2B and the state of a cutoff mechanism (one-way clutch 50 and hydraulic brake 60) when the vehicle is traveling. The "front" in FIG. 4 means the first drive device 1 that drives the front wheels Wf, and the "rear" means the second drive device 2 that drives the rear wheels Wr (RWr, LWr). The circles indicate operation (including driving and regeneration), and the hyphens indicate not operating (stopped). The "MOT state" indicates the state of the electric motors 2A and 2B of the second drive device 2. Further "ON" for the "cutoff mechanism" means that the ring gears 24A and 24B are locked, and "OFF" means that the ring gears 24A and 24B are in a free state. Also, "OWC" means the one-way clutch 50, and "BRK" means the hydraulic brake 60.

First, when stopped, the first drive device 1 at the front wheels Wf side and the second drive device 2 at the rear wheels Wr (RWr, LWr) side are both stopped, so the electric motors 2A and 2B are stopped, and the cutoff mechanism also is in a non-operating state. Next, after the key position is changed to ON, and an electric vehicle (EV) start is performed, the electric motors 2A and 2B of the second drive device 2 start. At this time, the cutoff mechanism is locked by the one-way clutch 50, and the power from the electric motors 2A and 2B is transmitted to the rear wheels RWr and LWr.

Then, acceleration is performed in an AWD (four wheels) state where both the first drive device 1 and second drive device 2 are driving. At this time as well, the cutoff mechanism is locked by the one-way clutch 50, and the power from the electric motors 2A and 2B is transmitted to the rear wheels RWr and LWr.

When performing EV cruising at low to mid-range speeds, the electric motor efficiency is good, so a rear wheel drive (RWD) state is entered where the first drive device 1 is in a non-operating state and only the second drive device 2 is driving. At this time as well, the cutoff mechanism is locked by the one-way clutch 50, and the power from the electric motors 2A and 2B is transmitted to the rear wheels RWr and LWr.

On the other hand, when performing high-speed cruising at a high speed range, the engine efficiency is good, so a front wheel drive (FWD) state is entered where the first drive device 1 is in an operating state. At this time, the one-way clutch 50 of the cutoff mechanism is disengaged (OWC free) and the hydraulic brake 60 is not operated, so the electric motors 2A and 2B stop. In a case of natural deceleration as well, the one-way clutch 50 of the cutoff mechanism is disengaged (OWC free) and the hydraulic brake 60 is not operated, so the electric motors 2A and 2B stop.

Now, when performing decelerating regeneration, e.g., when driving by drive force of the first drive device 1, the one-way clutch 50 is disengaged (OWC free) at one side of the cutoff mechanism but the hydraulic brake 60 is engaged, so regenerative charging is performed at the electric motors 2A and 2B. When traveling normally, the energy from traveling is recovered by regeneration at the electric motors 2A and 2B by collaboration with the braking control by the friction brakes. However, in a case of an emergency braking request (e.g., in a case where the antilock brake system (ABS) is activated), regeneration at the electric motors 2A and 2B is forbidden, and braking control by the friction brakes is given priority. In this case, the one-way clutch 50 is in a disengaged state (OWC free), and the hydraulic brake 60 is note operated, so the electric motors 2A and 2B stop.

In a case of backing up, either a RWD state where the first drive device 1 stops and the second drive device 2 is drivers, or an AWD state where both the first drive device 1 and second drive device 2 are driven, is realized. At this time, the electric motors 2A and 2B rotate in reverse, and the one-way clutch 50 at one side of the cutoff mechanism is disengaged (OWC free), but the power of the electric motors 2A and 2B is transmitted to the rear wheels RWr and LWr by connecting the hydraulic brake 60.

Next, the configuration of the ECU 6 serving as a control device according to the present embodiment will be described. The ECU 6 includes an input circuit having functions of shaping input signal waveforms from various types of sensors, correcting voltage levels to predetermined levels, converting analog signal values to digital signal values, and so forth, and a central processing unit (hereinafter "CPU"). The ECU 6 also has a storage circuit that stores various types of computation programs executed by the CPU and the results of computation and so forth, and an output circuit that outputs control signals to the PDU 8 and internal combustion engine 4, and so forth.

Figure 5:
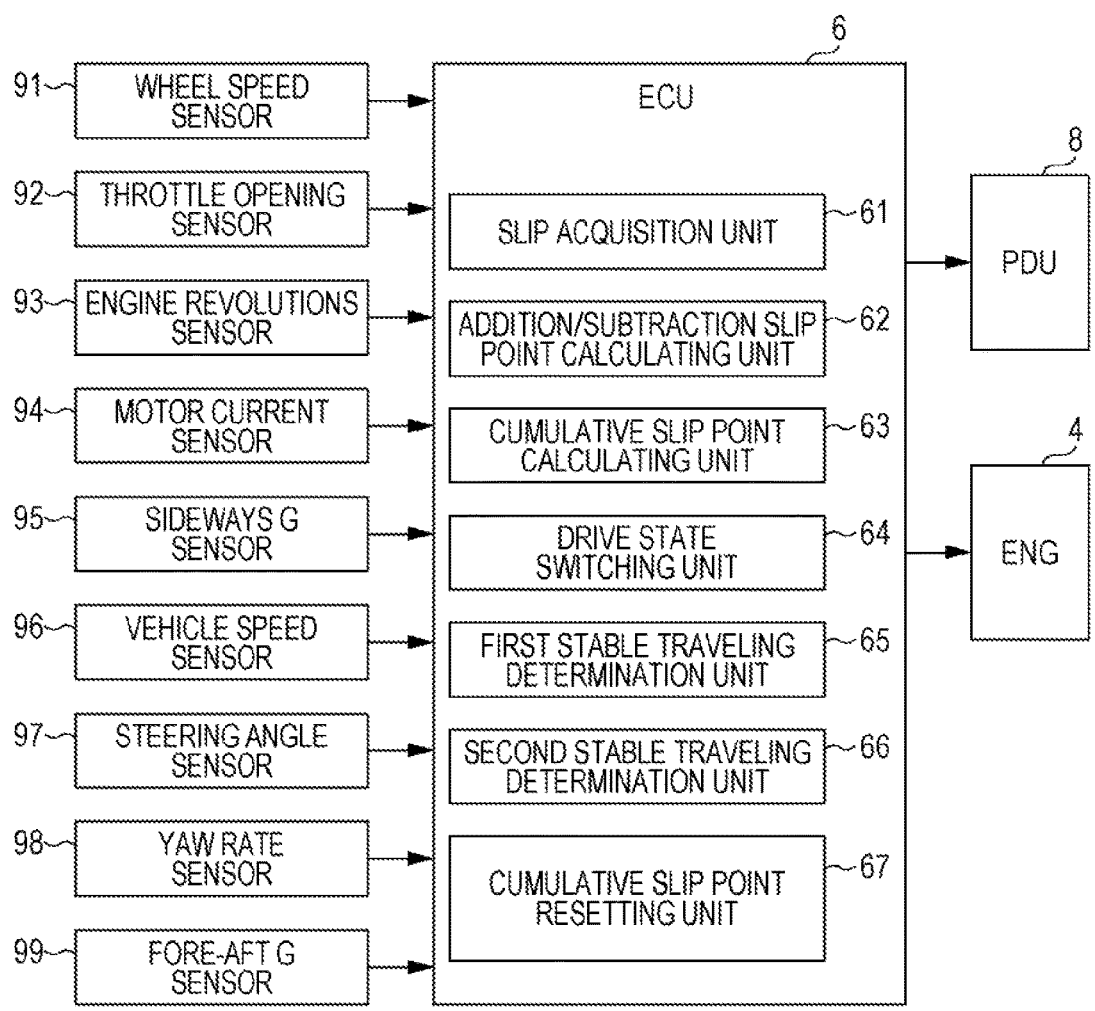
FIG. 5 is a functional block diagram illustrating the configuration of an ECU according to the embodiment.

The ECU 6 having the hardware configuration such as described above executes drive state switching control, where the drive state of the vehicle 3 is switched. FIG. 5 is a functional block diagram illustrating the configuration of the ECU 6 and the connection relationship of the parts connected to the ECO 6 according to the present embodiment. The ECU 6 receives input of detection signals of various types of sensors, such as a wheel speed sensor 91, throttle opening sensor 92, engine revolutions sensor 93, motor current sensor 34, lateral G sensor 95, vehicle speed sensor 96, steering angle sensor 97, yaw rate sensor 98, fore-aft G sensor 99, and so forth, as illustrated in FIG. 5. The ECU 6 also outputs control signals to the PDU 8 and the internal combustion engine 4. The ECU 6 further includes a slip acquisition unit 61, addition/subtraction slip point calculating unit 62, cumulative slip point calculating unit 63, drive state switching unit 64, first stable traveling determination unit 65, second stable traveling determination unit 66, and cumulative slip point resetting unit 67, as modules that execute drive state switching control. The functions of the modules will be described next.

The slip acquisition unit 61 acquires that an excessive slip, which is slipping a predetermined amount or more, has occurred at the front wheels Wf serving as first drive wheels or rear wheels Wr (RWr, LWr) serving as second drive wheels. Specifically, the slip acquisition unit 61 acquires that an excessive slip has occurred based on wheel speed difference of the front wheels Wf and rear wheels Wr (RWr, LWr) detected by the wheel speed sensor 91. When having acquired that an excessive slip has occurred, the slip acquisition unit 61 sets a slip determination flag to "1", and when not having acquired that an excessive slip has occurred, sets the slip determination flag to "0", Mow, the vehicle 3 can be deemed to be constantly experiencing minute slippage at the drive wheels even if the road is dry and the friction coefficient is high. Accordingly, the term "excessive slip" in the present embodiment excludes such minute slippage. Hereinafter, occurrence of excessive slipping may also be referred to simply as slipping.

Figure 6:
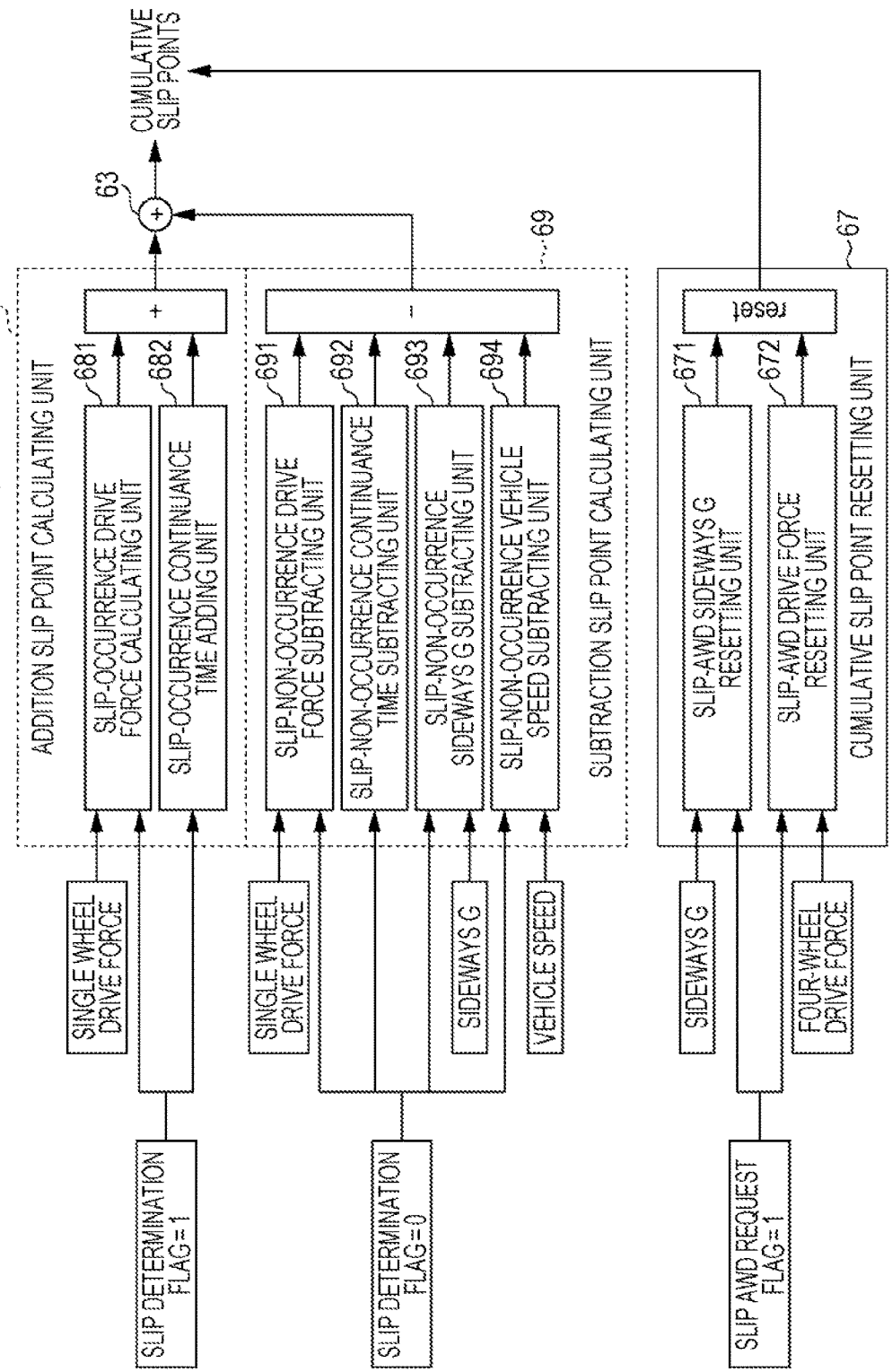
FIG. 6 is a functional block diagram illustrating the configuration of an addition/subtraction slip point calculating unit and cumulative slip point resetting unit according to the embodiment.

The addition/subtraction slip point calculating unit 62 calculates addition/subtraction slip points, that are addition slip points or subtraction slip points, in a time-discrete manner, based on the slip acquisition unit 61 having or having not acquired that an excessive slip has occurred. This point will be described with reference to FIG. 6. FIG. 6 is a functional block diagram illustrating the configuration of the addition/subtraction slip point calculating unit 62 according to the present embodiment. The addition/subtraction slip point calculating unit 62 includes an addition slip point calculating unit 68 and a subtraction slip point calculating unit 69, as illustrated in FIG. 6. When the slip acquisition unit 61 has acquired that an excessive slip has occurred, i.e., when the slip determination flag is "1", and when having not acquired that an excessive slip has occurred, i.e., when the slip determination flag is "0", the addition/subtraction slip point calculating unit 62 calculates addition/subtraction slip points based on drive force correlation values, as illustrated in FIG. 6.

Specifically, in a case where the slip determination flag is "1", the addition/subtraction slip point calculating unit 62 calculates an addition slip point of a positive value at the addition slip point calculating unit 68, based on drive force correlation values having correlation with the drive force of the drive wheels where the excessive slip has occurred, and transmits the calculated addition slip point to the cumulative slip point calculating unit 63. Also, in a case where the slip determination flag is "0", the addition/subtraction slip point calculating unit 62 calculates a subtraction slip point of a negative value at the subtraction slip point calculating unit 69, based on drive force correlation values having correlation with the drive force of the drive wheels where no excessive slip has occurred, and transmits the calculated subtraction slip point to the cumulative slip point calculating unit 63. Examples of drive force correlation values include wheel (single-wheel) drive force, wheel (single-wheel) torque, drive force of the first drive device 1 and second drive device 2 that drive the wheels, and torque of the first drive device 1 and second drive device 2 that drive the wheels. The following description will be made regarding wheel (single-wheel) drive force.

The addition slip point calculating unit 68 has a slip-occurrence drive force adding unit 681 and slip-occurrence continuance time adding unit 682. The addition slip point calculating unit 68 adds the positive value addition slip points calculated at these adding units to calculate an addition slip point.

The slip-occurrence drive force adding unit 681 calculates a drive force addition slip point as the addition slip point, by searching in a later-described drive force addition slip point calculation table (see FIG. 9) created and stored beforehand, in accordance with a single-wheel drive force N at the time of slippage occurring. The lower the single-wheel drive force at the time of the slip occurring is, the greater the drive force addition slip point calculated by the slip-occurrence drive force adding unit 681 is, provided that a drive state switching threshold value is not exceeded.

Now, the term "single-wheel drive force" as used in the present specification means that largest drive force of the drive forces of each of the four wheels of the vehicle 3. The single-wheel drive force is detected by sensors, and also estimated and acquired based on, for example, the throttle opening detected by the throttle opening sensor 92, the engine revolutions detected by the engine revolutions sensor 93 motor currents detected by the motor current sensors 94 provided to each of the electric motors 5, 2A, and 2B, and so forth. The drive state switching threshold value is set to an appropriate value serving as an index for switching between AWD and 2WD.

The slip-occurrence continuance time adding unit 682 searches a later-described time addition slip point calculation table (see FIG. 10) created and stored beforehand, in accordance with the slip-occurrence continuance time (seconds), i.e., the continuance time of the slip determination flag "1", and thereby calculates time addition slip points as addition slip points. The slip-occurrence continuance time adding unit 682 calculates time addition slip points that are larger the longer the slip-occurrence continuance time is, until the cumulative value of time addition slip points exceeds the later-described drive state switching threshold value, and after the cumulative value exceeds the drive state switching threshold value continues to calculate time addition slip points that are approximately 0.

Also, the subtraction slip point calculating unit 69 includes a slip-non-occurrence drive force subtracting unit 691, slip-non-occurrence continuance time subtracting unit 692, slip-non-occurrence lateral G subtracting unit 693, and slip-non-occurrence vehicle speed subtracting unit 694, as illustrated in FIG. 6. Subtraction slip points are calculated by adding the negative subtraction slip points calculated at these subtracting units.

The slip-non-occurrence drive force subtracting unit 691 calculates drive force subtraction slip points as subtraction slip points by searching a later-described drive force subtraction slip point calculation table (see FIG. 12) created and stored beforehand, in accordance with single-wheel drive force N when no slipping is occurring. The slip-non-occurrence drive force subtracting unit 691 calculates the drive force subtraction slip points to be 0 where the single-wheel drive force when no slip is occurring to be smaller than a predetermined value, and calculates a certain drive force subtraction slip point having a relatively large absolute value when at the predetermined value or higher.

The slip-non-occurrence continuance time subtracting unit 692 calculates time subtraction slip points as subtraction slip points by searching a later-described time subtraction slip point calculation table (see FIG. 14) created and sorted beforehand, in accordance with the slip-non-occurrence continuance time (seconds), i.e., the continuation time of the slip determination flag "0". The slip-non-occurrence continuance time subtracting unit 692 calculates certain time subtraction slip points having a relatively small absolute value, regardless of the slip-non-occurrence continuance time.

The slip-non-occurrence lateral G subtracting unit 693 calculates lateral G subtraction slip points as subtraction slip points by searching a later-described lateral G subtraction slip point calculation table (see FIG. 16) that has been created and stored beforehand, in accordance with lateral Gs detected by the lateral G sensor 95 when slippage is not occurring. The slip-non-occurrence lateral G subtracting unit 693 calculates a lateral G subtraction slip point as 0 when the lateral G when no slippage is occurring is smaller than a predetermined value, and calculates a certain lateral G subtraction slip point that has a relatively large absolute value when at the predetermined value or above.

The slip-non-occurrence vehicle speed subtracting unit 694 calculates vehicle speed subtraction slip points as subtraction slip points by searching a later-described vehicle speed subtraction slip point calculation table (see FIG. 18) that has been created and stored beforehand, in accordance with vehicle speed detected by the vehicle speed sensor 96 when slippage is not occurring. The slip-non-occurrence vehicle speed subtracting unit 694 calculates a certain vehicle speed subtraction slip point having a relatively large absolute value when the vehicle speed when no slippage is occurring is smaller than a predetermined value, and calculates the vehicle speed subtraction slip point as 0 when at the predetermined value or above.

The cumulative slip point calculating unit 63 integrates the addition slip points calculated by the addition slip point calculating unit 68 and the subtraction slip points calculated by the subtraction slip point calculating unit 69, thereby calculating cumulative slip points over time.

The cumulative slip point resetting unit 67 resets the cumulative slip points in a case where a later-described slip AWD request flag is "1" and a later-described reset determination flag also is "1", thereby setting the cumulative value of the cumulative slip points to a value smaller than the drive state switching threshold value. For example, the cumulative value of the cumulative slip points is set to zero by resetting the cumulative slip points.

Now, the cumulative slip point resetting unit 67 performs reset determination that is determination regarding whether or not the cumulative slip points should be reset, and sets the reset determination flag to "1" or "0" based on the results of reset determination. In a case where the traveling state of the vehicle 3 is stable and the road is estimated to have a high friction coefficient, the cumulative slip point resetting unit 67 resets the cumulative slip points so that the AWD request is readily cancelled.

Specifically, in a case where the vehicle 3 experiences predetermined lateral Gs or greater, the likelihood is high that the vehicle 3 is traveling on a road where the friction coefficient is high, so the cumulative slip points are reset so that the AWD request is readily cancelled according to the present embodiment. Also, in a case where the drive force of the vehicle 3 is a predetermined level or higher, the likelihood is high that the vehicle 3 is traveling on a road where the friction coefficient is high, so the cumulative slip points are reset so that the AWD request is readily cancelled. The cumulative slip point resetting unit 67 has a slip-AWD lateral G resetting unit 671 and a slip-AWD drive force resetting unit 672 as parts for performing reset determination based on these standards.

The slip-AWD lateral G resetting unit 671 calculates the lateral G, which is lateral acceleration on the vehicle 3, in a case where the slip AWD request flag is "1". In a case where the calculated lateral G is a lateral G threshold value for reset determination or higher, the reset determination flag is set to "1", and in a case where the calculated lateral G is smaller than the lateral G threshold value for reset determination, the reset determination flag is set to "0".

As for a specific lateral G calculation method, the slip-AWD lateral G resetting unit 671 detects lateral Gs by the lateral G sensor 95. Alternatively, the slip-AWD lateral G resetting unit 671 calculates lateral Gs according to $$\text{Lateral } G = (V^2 \times \sigma)/(1+A+V^2)/L \quad \text{Expression (1)}$$

as disclosed in Japanese Unexamined Patent Application Publication No. 2013-209048, the entire contents of which are incorporated herein by reference. In Expression (1), V represents the vehicle speed detected by the vehicle speed sensor 96, σ represents the tire steering angle detected by the steering angle sensor 97, A is a stability factor, and L is the wheelbase.

In the same way, the slip-AWD lateral G resetting unit 671 calculates lateral Gs according to $$\text{Lateral } G = (Yr \times V) \quad \text{Expression (2)}$$

as disclosed in the aforementioned Japanese Unexamined Patent Application Publication No. 2013-209048, the entire contents of which are incorporated herein by reference. In Expression (2), Yr represents the yaw rate detected by the yaw rate sensor 98, and V represents the vehicle speed detected by the vehicle speed sensor 96.

In a case where the slip AWD request flag is "1", the slip-AWD drive force resetting unit 672 calculates the four-wheel drive force N for the four-wheel drive force, and in a case where the calculated four-wheel drive force is a four-wheel drive force threshold value for reset determination or higher, sets the reset determination flag to "1". In a case where the calculated four-wheel drive force is smaller than the four-wheel drive force threshold value for reset determination, the reset determination flag is set to "0". Note that the four-wheel drive force in the present specification means the drive force of the four wheels of the vehicle 3. The four-wheel drive force is detected by sensors, and also estimated and acquired based on, for example, the throttle opening detected by the throttle opening sensor 92, the engine revolutions detected by the engine revolutions sensor 93 motor currents detected by the motor current sensors 94 provided to each of the electric motors 5, 2A, and 2B, and so forth.

Returning to FIG. 5, based on the cumulative slip points calculated by the cumulative slip point calculating unit 63, the drive state switching unit 64 switches between 2WD where the vehicle 3 is driven by just one of the front wheels Wf serving as first drive wheels and rear wheels Wr (RWr, LWr) serving as second drive wheels, and AWD where the vehicle 3 is driven by both front wheels Wf serving as first drive wheels and rear wheels Wr (RWr, LWr) serving as second drive wheels. 2WD includes FWD where the vehicle 3 is driven by just the front wheels Wf, and RWD where the vehicle 3 is driven by just the rear wheels Wr (RWr, LWr). Accordingly, the drive state switching unit 64 executes switching among FWD, RWD, and AWD.

Specifically, the drive state switching unit 64 sets the slip AWD request flag to "1" in a case where the cumulative slip points are at the drive state switching threshold value or higher, and switches the drive state of the vehicle 3 to AWD. Also, the drive state switching unit 64 sets the slip AWD request flag to "0" in a case where the cumulative slip points are below the drive state switching threshold value and also a later-described first stable traveling determination flag is "1", and switches the drive state of the vehicle 3 to 2WD.

When the reset determination flag changes to "1", this triggers the drive state switching unit 64 to reset the cumulative slip points using the cumulative slip point resetting unit 67. Also, in a case where a later-described second stable traveling determination flag is "1", the drive state switching unit 64 sets the slip AWS request flag to "0", and switches the drive state of the vehicle 3 to 2WD. When setting the drive state of the vehicle 3 to 2WD, the drive state switching unit 64 measures the vehicle speed using the vehicle speed sensor 96. If the measurement results show that the vehicle speed is low to mid-range EV cruising, the electric motor efficiency is good, so the drive state is switched to RWD where the first drive device 1 is in a non-operating state and only the second drive device 2 is driving. On the other hand, if the vehicle speed is determined to be high-speed cruising at a high speed range, the engine efficiency is good, the drive state is switched to FWD where the first drive device 1 is in an operating state.

The first stable traveling determination unit 65 performs first stable traveling determination which is determination regarding whether or not the vehicle 3 is traveling in a stable manner. Now, the first stable traveling determination determines that the vehicle 3 is traveling in a stable state less readily than the later-described second stable traveling determination. For example, a threshold value that needs to be exceeded for determination to be made of a stable traveling state is higher in the first stable traveling determination as compared to the later-described second stable traveling determination. Also for example, a threshold value that needs to be underrun for determination to be made of a stable traveling state is lower in the first stable traveling determination as compared to the later-described second stable traveling determination. Moreover, the first stable traveling determination has more determination items for determination to be made of a stable traveling state as compared to the later-described second stable traveling determination.

Specifically, in a case where the slip AWD request flag is "1" in the first stable traveling determination, determination is made regarding whether or not the vehicle 3 is traveling in a stable state, based on detection values of the steering angle sensor 97, yaw rate sensor 98, lateral G sensor 95, vehicle speed sensor 96, fore-aft G sensor 99, and so forth, and estimation values using these detection values. In this case, the first stable traveling determination unit 65 determines whether or not the vehicle 3 is traveling in a stable state by executing the first stable traveling determination. When determination is made that the vehicle 3 is traveling in a stable state, the first stable traveling determination unit 65 sets the first stable traveling determination flag to "1", and when determination is made that the vehicle 3 is not traveling in a stable state, sets the first stable traveling determination flag to "0". Note that the first stable traveling determination flag is a permission determination flag for changing settings of the slip AWD request flag, and is not forcibly set with higher priority over other flags when the vehicle 3 is traveling in a stable state.

The second stable traveling determination unit 66 performs second stable traveling determination which is determination regarding whether or not the vehicle 3 is traveling in a stable manner. Now, the second stable traveling determination determines that the vehicle 3 is traveling in a stable state more readily than the above-described first stable traveling determination. For example, a threshold value that needs to be exceeded for determination to be made of a stable traveling state is lover in the second stable traveling determination as compared to the above-described first stable traveling determination. Also for example, a threshold value that needs to be underrun for determination to be made of a stable traveling state is higher in the second stable traveling determination as compared to the above-described first stable traveling determination. Moreover, the second stable traveling determination has fewer determination items for determination to be made of a stable traveling state as compared to the above-described first stable traveling determination.

Specifically, in a case where the slip AWD request flag is "1", determination is made regarding whether the vehicle 3 is traveling in a stable state, based on detection values of the steering angle sensor 97, lateral G sensor 95, fore-aft G sensor 99, and so forth, and estimation values using these detection values. In this case, the second stable traveling determination unit 66 determines whether or not the vehicle 3 is traveling in a stable state by executing the second stable traveling determination. When, determination is made that the vehicle 3 is traveling in a stable state, the second stable traveling determination unit 66 sets the second stable traveling determination flag to "1", and when determination is made that the vehicle 3 is not traveling in a stable state, sets the second stable traveling determination flag to "0". Note that the second stable traveling determination flag is a permission determination flag for changing settings of the slip AWD request flag, and is not forcibly set with higher priority over other flags when the vehicle 3 is traveling in a stable state.

Figure 7:
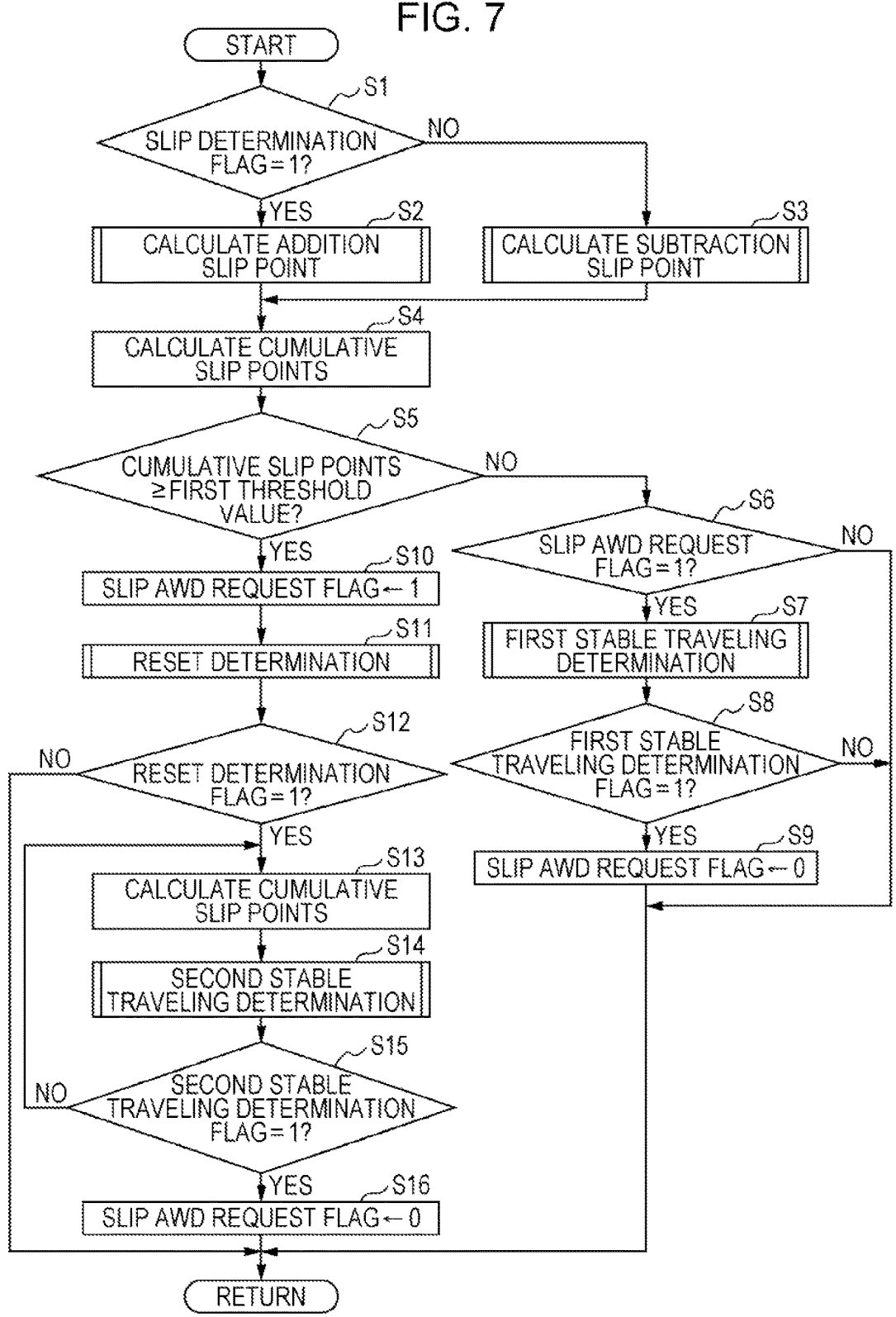
FIG. 7 is a flowchart illustrating procedures of drive state switchover control according to the embodiment.

Next, drive state switching control executed by the ECU 6 according to the present embodiment will be described. FIG. 7 is a flowchart illustrating procedures for drive state switching control according to the present embodiment. This control processing is repeatedly executed at the ECU 6.

In step S1, differentiation is made regarding the slip determination flag, whether "1" or not. In the case that this differentiation yields YES, occurrence of slipping has been acquired, so the flow advances to step S2, an addition slip point is calculated, following which the flow advances to step S4. If the differentiation yields NO, no slipping is occurring, so the flow advances to step S3, a subtraction slip point is calculated, following which the flow advances to step S4.

In step S4, the previous value of the cumulative slip points is integrated with the addition slip point calculated in step S2 or the subtraction slip point calculated in step S3, thereby calculating cumulative slip points. The flow then advances to step S5.

In step S5, differentiation is made regarding whether or not the cumulative slip points calculated in step S4 are the drive state switching threshold value or higher. In a case where this differentiation yields YES, the flow advances to step S10, and if NO, the flow advances to step S6.

In step S6, differentiation is made regarding whether or not the slip AWD request flag is "1". In a case where this differentiation yields YES, the flow advances to step S7, and if NO, the flow ends. Accordingly, 2WD, i.e., either FWD or RWD, is maintained.

In step S7, first stable traveling determination, which is determination regarding whether or not the vehicle 3 is traveling in a stable state, is made. In a case where determination is made that the vehicle 3 is traveling in a stable state, the first stable traveling determination flag is set to "1". In a case where determination is made that the vehicle 3 is not traveling in a stable state, the first stable traveling determination flag is set to "0".

In step S8, differentiation is made regarding whether or not the first stable traveling determination flag set by the first stable traveling determination in step S7 is "1". In a case where this differentiation yields YES, stability of the vehicle 3 has been secured, so the flow advances to step S9, sets the slip AWD request flag to "0", and thereafter the flow ends. Thus, switching to 2WD, i.e., either FWD or RWD, is executed.

In a case where the differentiation in step S8 yields NO, stability of the vehicle 3 has not been secured, so the slip AWD request flag is not changed from the current settings "1", and the flow ends with the slip AWD request flag at "1". Thus, AWD is maintained.

In step S10, the slip AWD request flag is set to "1". Thus, either the drive state is switched to AWD, or is maintained at AWD.

In step S11, reset determination, which is determination regarding whether or not to reset the cumulative slip points, is performed. If determination is made to reset the cumulative slip points, the reset determination flag is set to "1", and if determination is made not to reset the cumulative slip points, the reset determination flag is set to "0".

In step S12, differentiation is made regarding whether or not the reset determination flag set according to the reset determination in step S11 is "1". In a case where this differentiation yields YES, it can be estimated that stability of the vehicle 3 has been secured, so the flow advances to step S13 to reset the cumulative slip points so as to realize a state where the AWD request is more readily cancelled, and the cumulative slip points are reset.

In a case where the differentiation in step S12 yields NO, it can be estimated that stability of the vehicle 3 has not been secured, so there is no need to realize a state where the AWD request is more readily cancelled. Accordingly, the slip AWD request flag is not changed from the current settings "1", and the flow ends with the slip AWD request flag at "1". Thus, AWD is maintained.

In step S14, second stable traveling determination, which is determination regarding whether or not the vehicle 3 is traveling in a stable state, is made. In a case where determination is made that, the vehicle 3 is traveling in a stable state, the second stable traveling determination flag is set to "1". In a case where determination is made that the vehicle 3 is not traveling in a stable state, the second stable traveling determination flag is set to "0".

In step S15, differentiation is made regarding whether or not the second stable traveling determination flag set by the second stable traveling determination in step S14 is "1". In a case where this differentiation yields YES, stability of the vehicle 3 has been secured, so the flow advances to step S16, sets the slip AWD request flag to "0", and thereafter the flow ends. Thus, switching to 2WD, i.e., either FWD or RWD, is executed.

In a case where the differentiation in step S15 yields NO, stability of the vehicle 3 has not been secured, so the slip AWD request flag is not changed from the current settings "1", and the determination in step S14 is performed again with the slip AWD request flag remaining at "1". That is to say, after having reset the cumulative slip points in step S13, the determination in step S14 is continued until the differentiation in step S15 yields YES. Accordingly, the AWD request is more readily cancelled. An arrangement may be made where this flow ends in a case where a state in which the differentiation in step S15 is NO for a predetermined amount of time or longer. That is to say, the processing may be performed again from step S1, and accumulation of cumulative slip points may be restarted. Note that the steps relating to first stable traveling determination, based on stable traveling of the vehicle 3 in steps S7 and S8, may be omitted.

Next, the subroutines performed in steps S2, S3, S7, S11, and S14 in FIG. 7 will be described with reference to the drawings. First, the addition slip point calculation processing according to the present embodiment that is executed in step S2 in FIG. 7 will be described. In the addition slip point calculation processing according to the present embodiment, the addition slip points are calculated by the drive force addition slip point calculation processing performed by the slip-occurrence drive force adding unit 681 and the time addition slip point calculation processing performed by the slip-occurrence continuance time adding unit 682, following which processing of totaling these calculated addition slip points is performed by the cumulative slip point calculating unit 63.

Figure 8:
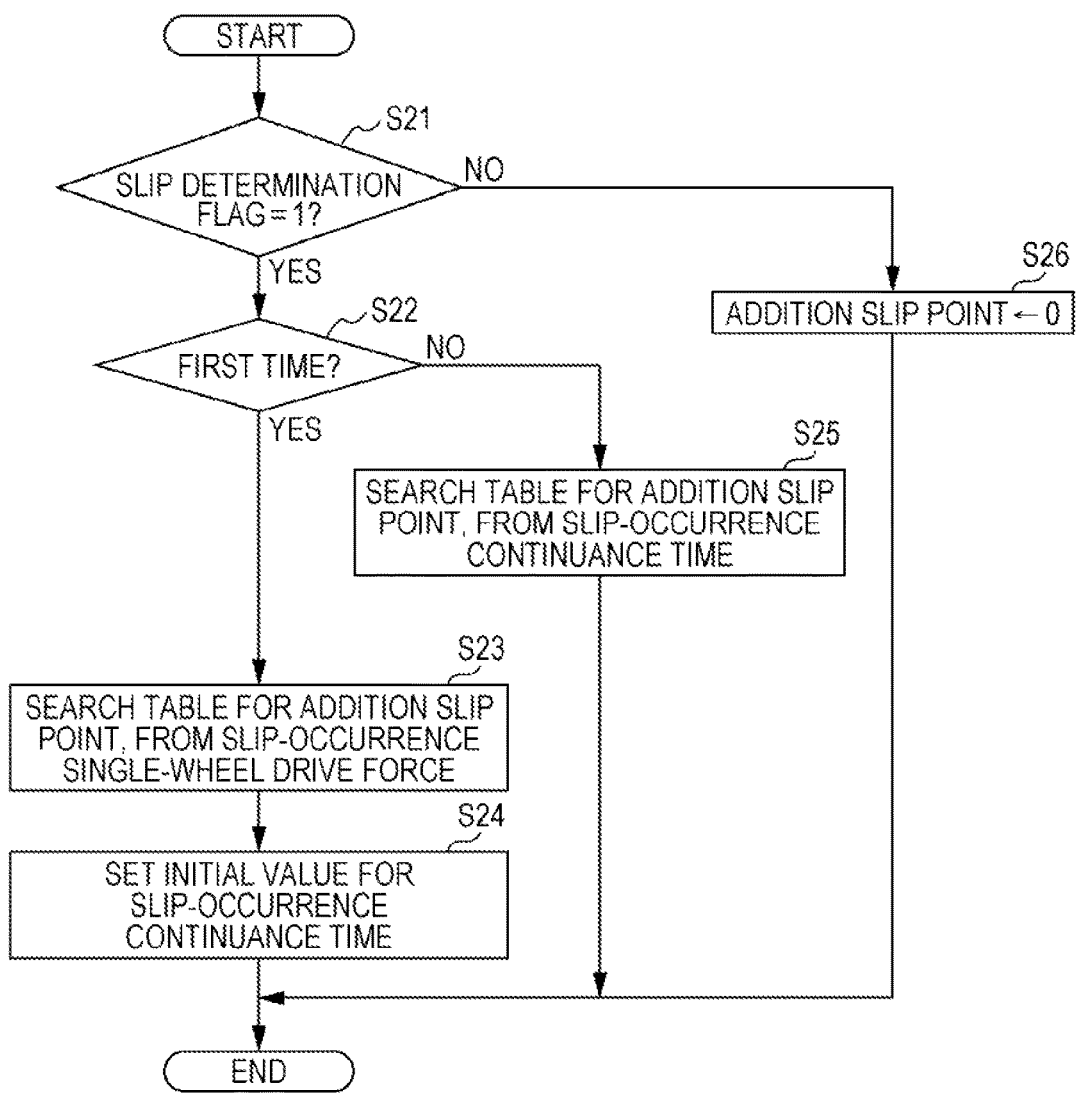
FIG. 8 is a flowchart illustrating procedures of addition slip point calculation processing according to the embodiment.

FIG. 8 is a flowchart illustrating procedures of the addition slip point calculation processing according to the present embodiment. In step S21, differentiation is made regarding whether or not the slip determination flag is "1". In a case where this differentiation yields YES, the flow advances to step S22, and if not, the flow advances to step S26 where the addition slip point is reset to "0", and the flow ends.

In step S22, differentiation is made regarding whether this processing is being performed for the first time or not. In a case where this differentiation yields YES, the flow advances to step S23, and if NO, to step S25.

In step S23, a table search is performed for an addition slip point from single-wheel drive force when slippage is occurring. Specifically, a drive force addition slip point is calculated by searching the drive force addition slip point calculation table created beforehand and stored in the slip-occurrence drive force adding unit 681, in accordance with the single-wheel drive force when slippage is occurring. Thereafter, the flow advances to step S24.

Figure 9:
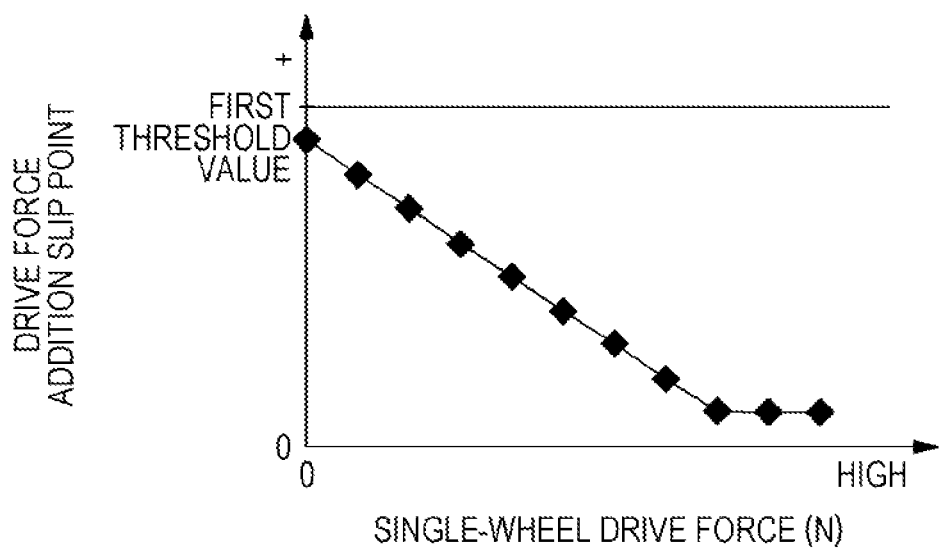
FIG. 9 is a diagram illustrating a drive force addition slip point calculation table stored in a slip-occurrence drive force adding unit according to the embodiment.

Now, FIG. 9 is a diagram illustrating the drive force addition slip point calculation table stored in the slip-occurrence drive force adding unit 681. The horizontal axis in FIG. 9 represents single-wheel drive force N, and the vertical axis represents the drive force addition slip point having a positive value. The drive force addition slip point calculation table illustrated in FIG. 9 is set such that the lower the drive force is regarding the single-wheel drive force when slippage is occurring, the greater the drive force addition slip point is in proportion, within a range that does not exceed the drive state switching threshold value. The reason is that when slipping, the lower the drive force is regarding single-wheel drive force the lower the friction coefficient of the road surface is, so setting the drive force addition slip point to a greater value switches to AWD quicker or maintains AWD traveling time longer. Note however, that when the single-wheel drive force reaches a certain level, the drive force addition slip point becomes constant.

Returning to FIG. 8, in step S24 an initial value is set for slip-occurrence continuation time, and the flow ends. This is the first time for this processing, so when step S24 is executed, the slip-occurrence continuation time will be 0 seconds. Accordingly, the time addition slip point is preferably 0. To this end, the cumulative value of time addition slip points when the slip-occurrence continuation time is 0 seconds, i.e., the initial value of the slip-occurrence continuation time, may be set to 0 as indicated by the Y-intercept in later-described FIG. 10, for example.

In step S25, a table search is performed for an addition slip point from slip-occurrence continuation time when slippage is occurring. Specifically, the time addition slip point is calculated by searching the time addition slip point calculation table created beforehand and stored in the slip-occurrence continuance time adding unit 682, in accordance with the slip-occurrence continuation time, and the flow ends.

Figure 10:
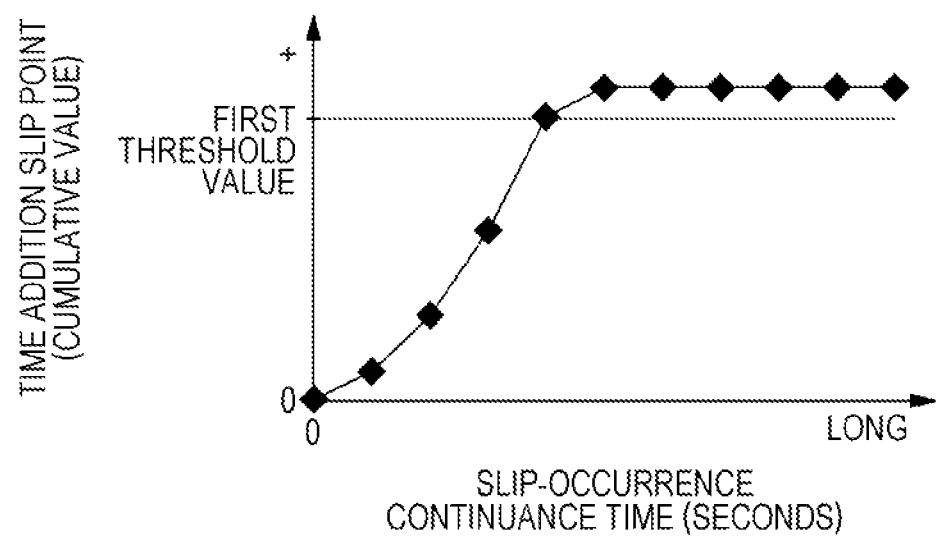
FIG. 10 is a diagram illustrating a time addition slip point calculation table stored in a slip-occurrence continuance time adding unit according to the embodiment.

Now, FIG. 10 is the time addition slip point calculation table stored in the slip-occurrence continuance time adding unit 682. The horizontal axis in FIG. 10 represents the slip-occurrence continuation time (in seconds), and the vertical axis illustrates the cumulative value of time addition slip points having a positive value. That is to say, discrete and pure time addition slip points for each time are represented by the difference between a cumulative value of time addition slip points at one point in FIG. 10 and a cumulative value of time addition slip points at a point adjacent thereto.

The time addition slip point calculation table in FIG. 10 is set such that the longer the slip-occurrence continuation time is, the greater the time addition slip point is, until the cumulative value of time addition slip points exceeds the drive state switching threshold value. This is because if the slip-occurrence continuation time is too short, there is a possibility that the slip determination may have been erroneous. Accordingly, the time addition slip point is set smaller, thereby avoiding a situation where the drive state is needlessly switched to AWD even though the friction coefficient of the road surface is high.

Note that a time addition slip point is set in accordance with the slip-occurrence continuation time, so as to be within the AWD request response time. Further, after the cumulative value of the time addition slip points has exceeded the drive state switching threshold value or predetermined value, time addition slip points that are approximately 0 are continuously calculated in this arrangement, so that the cumulative value of time addition slip points is set to be constant. The reason is that if the cumulative value of time addition slip points greatly exceeds the drive state switching threshold value, the AWD continuation time will continue too long, and as a result drive efficiency (fuel consumption and electricity consumption) will suffer.

Next, the subtraction slip point calculation processing relating to the present embodiment, executed in step S3 in FIG. 7, will be described. In the subtraction slip point calculation processing according to the present embodiment, the subtraction slip points are calculated by drive force subtraction slip point calculation processing, time subtraction slip point calculation processing, lateral G subtraction slip point calculation processing, and vehicle speed subtraction slip point calculation processing, and thereafter processing is executed to total the calculated subtraction slip points.

Figure 11:
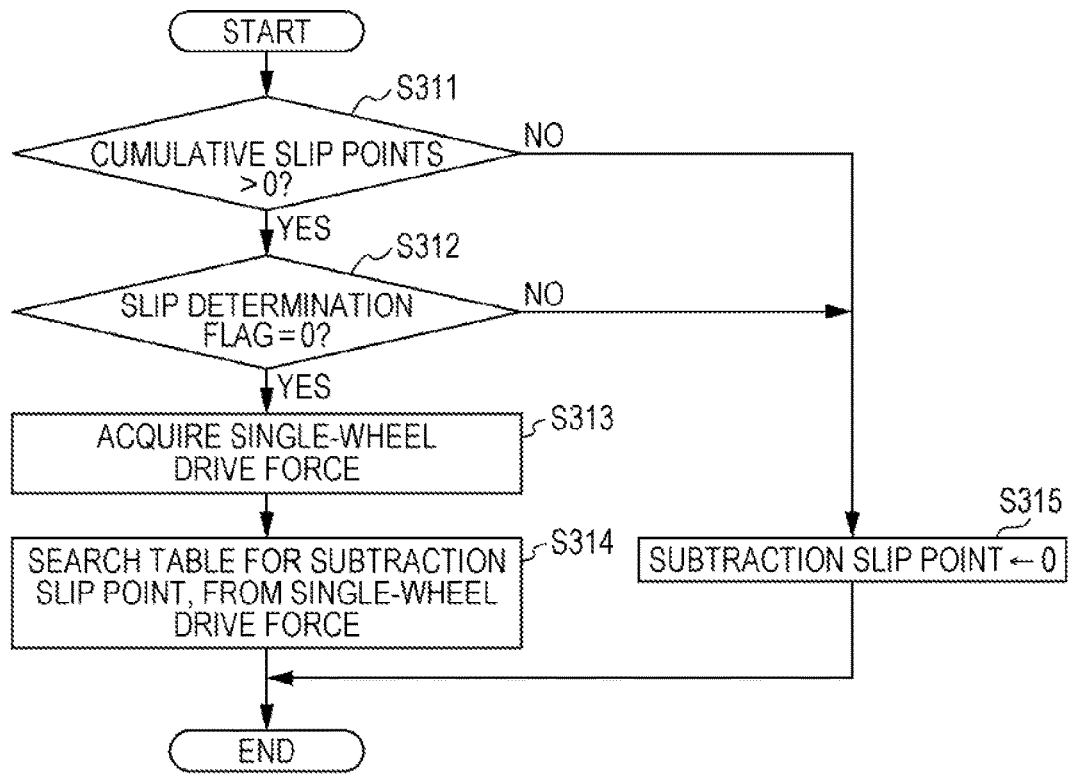
FIG. 11 is a flowchart illustrating procedures of drive force subtraction slip point calculation processing according to the embodiment.

FIG. 11 is a flowchart illustrating procedures of drive force subtraction slip point calculation processing according to the present embodiment. In step S311, differentiation is made regarding whether or not the cumulative slip point is larger than 0. In a case where this differentiation yields YES, meaning that cumulative slip points are accumulated, the flow advances to step S312. In a case where this differentiation yields NO, meaning, that cumulative slip points are not accumulated the flow advances to step S315 where the subtraction slip point is set to 0, and the flow ends. Accordingly, only 0 is calculated for the subtraction slip point when the cumulative slip point is 0, thereby avoiding a situation where the value of the cumulative slip point is negative.

In step S312, differentiation is made regarding whether or not the slip determination flag is "0". In a case where this differentiation yields YES, the flow advances to step S313 where single-wheel drive force when slippage is not occurring is acquired, and the flow advances to step S314. In a case where this differentiation yields NO, the flow advances to step S315 where the subtraction slip point is set to 0, and the flow ends.

In step S314, a table search is performed for a subtraction slip point from the single-wheel drive force acquired in step S313, and the flow ends. Specifically, the drive force subtraction slip point calculation table, created beforehand and stored in the slip-non-occurrence drive force subtracting unit 691, is searched in accordance with single-wheel drive force when no slippage is occurring, thereby calculating drive force subtraction slip points.

Figure 12:
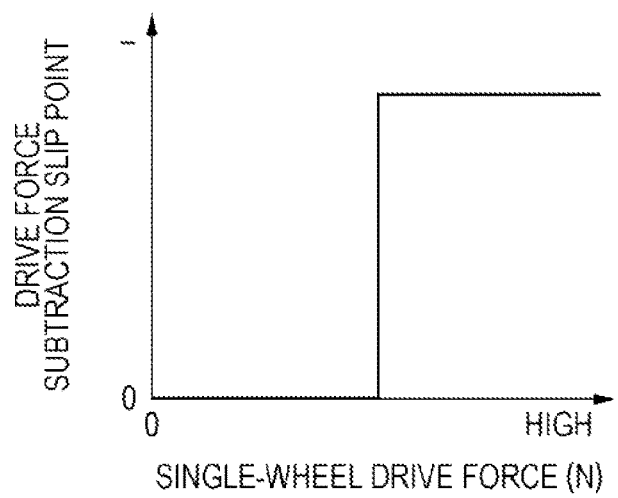
FIG. 12 is a diagram illustrating a drive force subtraction slip point calculation table stored in a slip-occurrence drive force subtracting unit according to the embodiment.

Now, FIG. 12 is a diagram illustrating the drive force subtraction slip point calculation table stored in the slip-non-occurrence drive force subtracting unit 691. The horizontal axis in FIG. 12 represents single-wheel drive force N, and the vertical axis represents the drive force subtraction slip point, having a negative value. The drive force subtraction slip point calculation table illustrated in FIG. 12 is set such that the drive force subtraction slip point is 0 where the single-wheel drive force where no slipping is occurring is smaller than a predetermined value, and the drive force subtraction slip point is a constant value with a relatively large absolute value at or above the predetermined value. The reason is, that in a case where no slipping is occurring, the higher the single-wheel drive force is, the higher the friction coefficient of the road surface most certainly is, so setting the drive force subtraction slip point to a larger value enables a situation where the drive state is switched to 2WD even though the friction coefficient of the road surface is low to be avoided.

Figure 13:
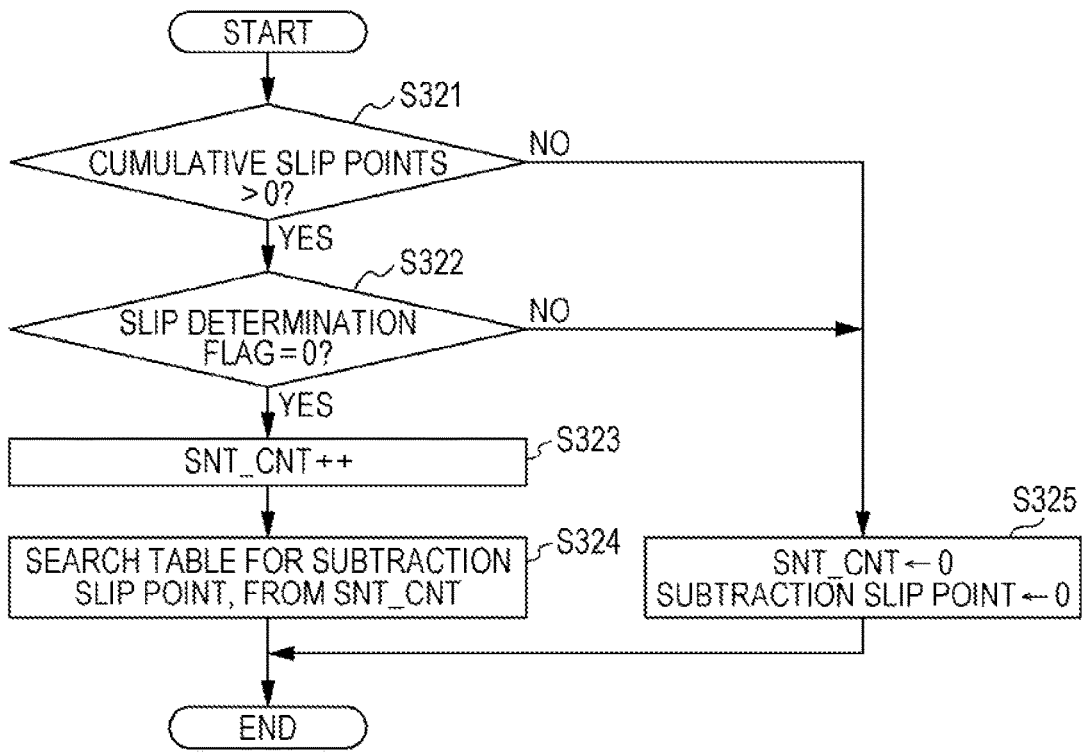
FIG. 13 is a flowchart illustrating procedures of time subtraction slip point calculation processing according to the embodiment.

FIG. 13 is a flowchart illustrating procedures for time subtraction slip point calculation processing according to the present embodiment. In step S321, differentiation is made regarding whether or not the cumulative slip point is larger than 0. In a case where this differentiation yields YES, and there is an accumulation of cumulative slip points, the flow advances to step S322. In a case where this differentiation yields NO and there is no accumulation of cumulative slip points, the flow advances to step S325 where a slip-non-occurrence continuation time counter value SNT_CNT is reset to 0, the subtraction slip point is set to 0, and the flow ends. Accordingly, only 0 is calculated for the subtraction slip point when the cumulative slip point is 0, thereby avoiding a situation where the value of the cumulative slip point is negative.

In step S322, differentiation is made regarding whether or not the slip determination flag is "0". In a case where this differentiation yields YES, the flow advances to step S323 where the slip-non-occurrence continuation time counter value SNT_CNT is incremented, following which the flow advances to step S324. In a case where this differentiation yields NO, the flow advances to step S325 where the slip-non-occurrence continuation time counter value SNT_CNT is reset to 0, the subtraction slip point is set to 0, and the flow ends.

In step S324, a table search is performed for a subtraction slip point, from the slip-non-occurrence continuation time counter value SNT_CNT incremented in step S323, and the flow ends. Specifically, the time subtraction slip point is calculated by searching the time subtraction slip point calculation table created beforehand and stored in the slip-non-occurrence continuance time subtracting unit 692, in accordance with the slip-non-occurrence continuation time counter value SNT_CNT, i.e., the slip-non-occurrence continuation time (in seconds).

Figure 14:
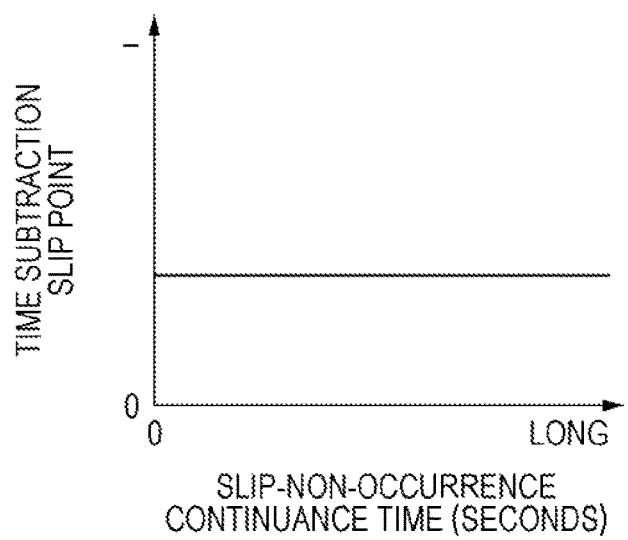
FIG. 14 is a diagram illustrating a time subtraction slip point calculation table stored in a slip-non-occurrence continuance time subtracting unit according to the embodiment.

Now, FIG. 14 is a diagram illustrating the time subtraction slip point calculation table stored in the slip-non-occurrence continuance time subtracting unit 692. The horizontal axis in FIG. 14 represents slip-non-occurrence continuation time (in seconds), and the vertical axis represents time subtraction slip point of a negative value. The time subtraction slip point calculation table illustrated in FIG. 14 is set so that the time subtraction slip point is constant and has a relatively small absolute value, regardless of the slip-non-occurrence continuation time. This is to gradually reduce the cumulative slip points over the slip-non-occurrence continuation time.

Figure 15:
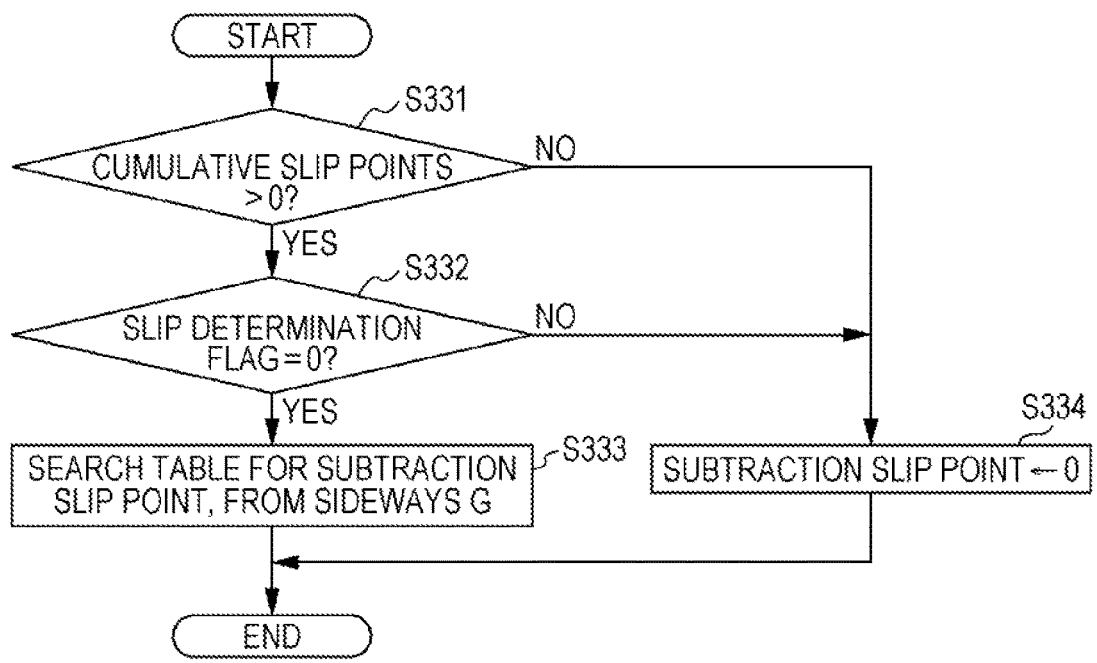
FIG. 15 is a flowchart illustrating procedures of lateral G subtraction slip point calculation processing according to the embodiment.

FIG. 15 is a flowchart illustrating procedures for lateral G subtraction slip point calculation processing according to the present embodiment. In step S331, differentiation is made regarding whether the cumulative slip point is larger than 0. In a case where this differentiation yields YES, meaning that cumulative slip points are accumulated, the flow advances to step S332. In a case where this differentiation yields NO, meaning that cumulative slip points are not accumulated, the flow advances to step S334 where the subtraction slip point is set to 0, and the flow ends. Accordingly, only 0 is calculated for the subtraction slip point when the cumulative slip point is 0, thereby avoiding a situation where the value of the cumulative slip point is negative.

In step S332, differentiation is made regarding whether or not the slip determination flag is "0". In a case where this differentiation yields YES, the flow advances to step S333. In a case where this differentiation yields NO, the flow advances to step S334 where the subtraction slip point is set to 0, and the flow ends.

In step S333, a table search is performed for a subtraction slip point from the lateral Gs when not slipping, and the flow ends. Specifically, the lateral G subtraction slip point calculation table, created beforehand and stored in the slip-non-occurrence lateral G subtracting unit 693, is searched in accordance with lateral Gs when no slippage is occurring, thereby calculating lateral G subtraction slip points.

Figure 16:
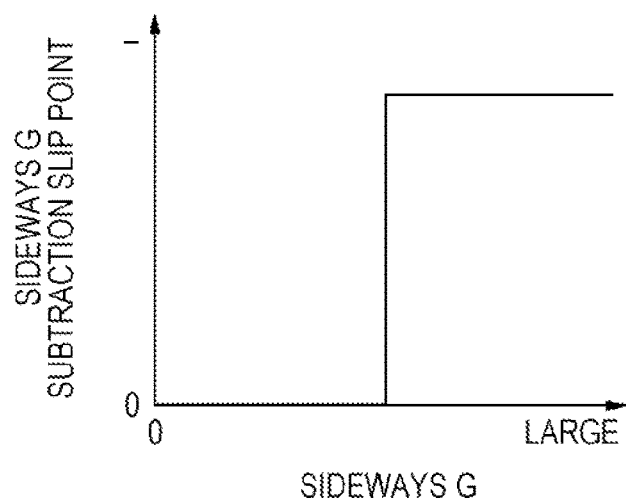
FIG. 16 is a diagram illustrating a lateral G subtraction slip point calculation table stored in a slip-non-occurrence lateral G subtracting unit according to the embodiment.

Now, FIG. 16 is a diagram illustrating the lateral G subtraction slip point calculation table stored in the slip-non-occurrence lateral G subtracting unit 693. The horizontal axis in FIG. 16 represents lateral Gs, and the vertical axis represents the lateral G subtraction slip point having a negative value. The lateral G subtraction slip point calculation table illustrated in FIG. 16 is set such that the lateral G subtraction slip point is 0 where the lateral Gs where no slipping is occurring is smaller than a predetermined value, and the lateral G subtraction slip point is a constant value with a relatively large absolute value at or above the predetermined value. The reason is, that in a case where no slipping is occurring, the greater the lateral Gs are, the higher the friction coefficient of the road surface most certainly is, so setting the lateral G subtraction slip point to a larger value enables a situation where the drive state is switched to 2WD even though the friction coefficient of the road surface is low to be avoided.

Figure 17:
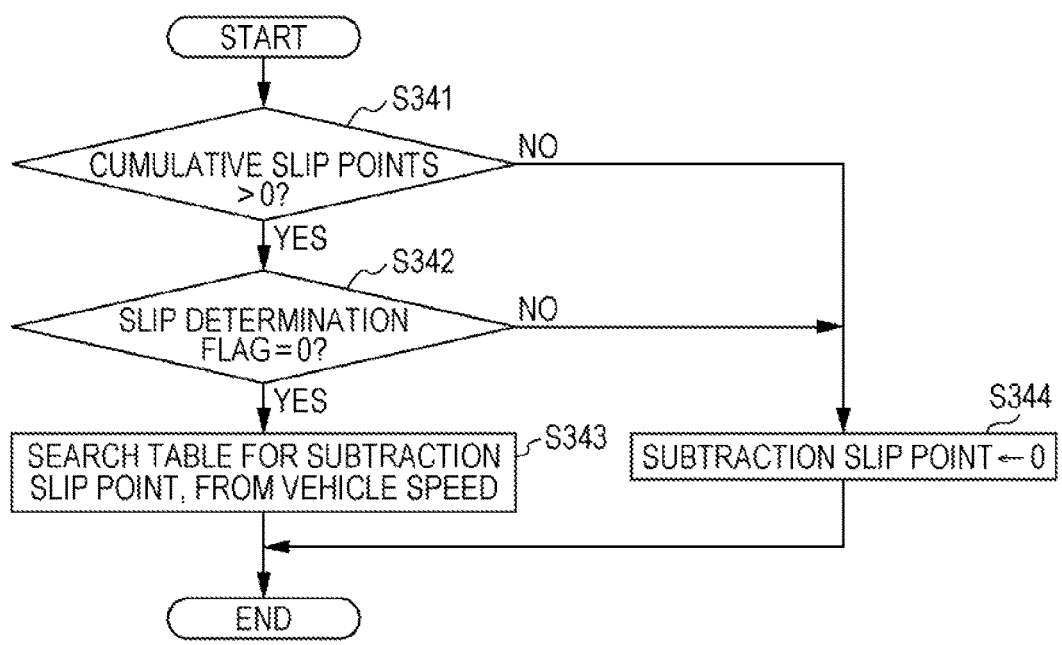
FIG. 17 is a flowchart illustrating procedures of vehicle, subtraction slip point calculation processing according to the embodiment.

FIG. 17 is a flowchart illustrating procedures of vehicle speed subtraction slip point calculation processing according to the present embodiment. In step S341, differentiation is made regarding whether the cumulative slip point is larger than 0. In a case where this differentiation yields YES, meaning that cumulative slip points are accumulated, the flow advances to step S342. In a case where this differentiation yields NO, meaning that cumulative slip points are not accumulated, the flow advances to step S344 where the subtraction slip point is set to 0, and the flow ends. Accordingly, only 0 is calculated for the subtraction slip point when the cumulative slip point is 0, thereby avoiding a situation where the value of the cumulative slip point is negative.

In step S342, differentiation is made regarding whether or not the slip determination flag is "0". In a case where this differentiation yields YES, the flow advances to step S343. In a case where this differentiation yields NO, the flow advances to step S344 where the subtraction slip point is set to 0, and the flow ends.

In step S343, a table search is performed for a subtraction slip point from the vehicle speed when not slipping, and the flow ends. Specifically, the vehicle speed subtraction slip point calculation table, created beforehand and stored in the slip-non-occurrence vehicle speed subtracting unit 694, is searched in accordance with vehicle speed when no slippage is occurring, thereby calculating vehicle speed subtraction slip points.

Figure 18:
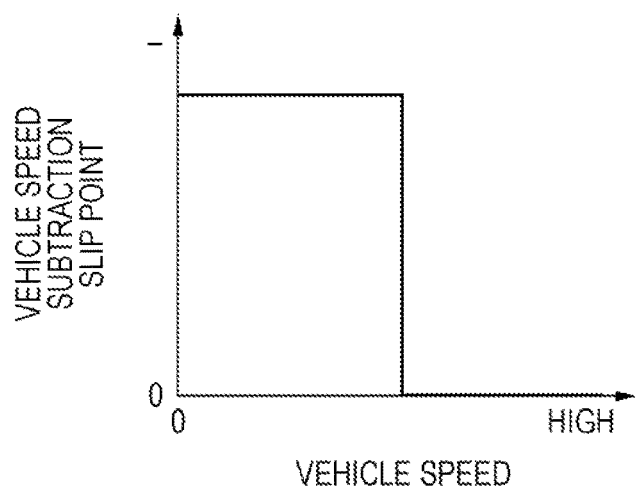
FIG. 18 is a diagram illustrating a vehicle deceleration subtraction slip point calculation table stored in a slip-non-occurrence vehicle speed subtracting unit according to the embodiment.

Now, FIG. 18 is a diagram illustrating the vehicle speed subtraction slip point calculation table stored in the slip-non-occurrence vehicle speed subtracting unit 694. The horizontal axis in FIG. 18 represents vehicle speed, and the vertical axis represents vehicle speed subtraction slip points of a negative value. The vehicle speed subtraction slip point calculation table in FIG. 18 is set such that a constant vehicle speed subtraction slip point that has a relatively Large absolute value is obtained if the vehicle speed when no slippage is occurring is smaller than a predetermined value, and for the vehicle speed subtraction slip point to be 0 at or above the predetermined value. The reason for this is as follows. Even if slipping occurs at low vehicle speeds below the predetermined value, the behavior of the vehicle will not foe greatly affected, so the vehicle speed subtraction slip point is set to be a constant value with a relatively great absolute value, while the vehicle speed subtraction slip point is set to be 0 at high speeds, thereby realizing switching from AWD to 2WD at a more suitable timing.

Figure 19:
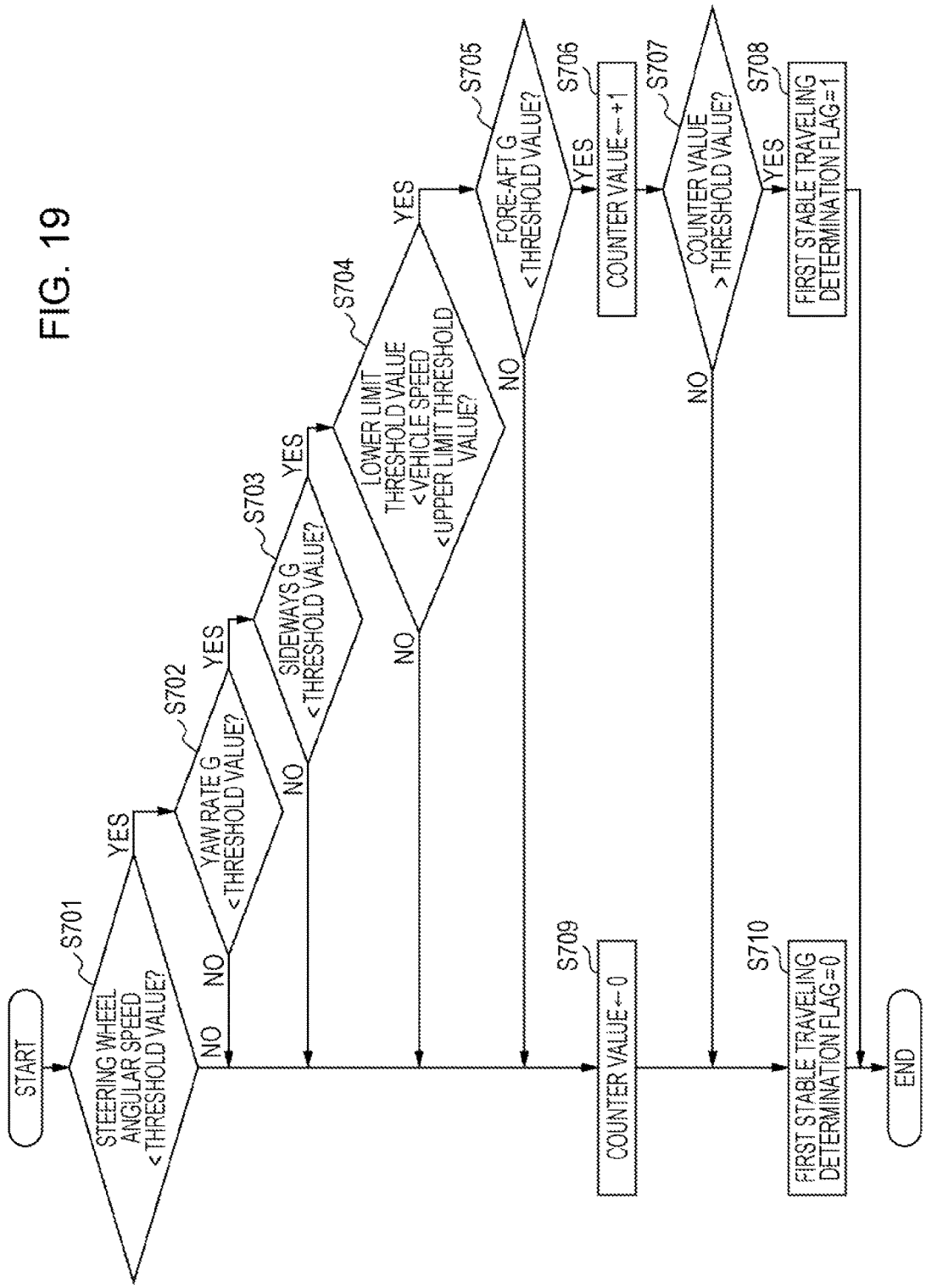
FIG. 19 is a flowchart illustrating procedures of first stable traveling determination according to the embodiment.

Next, the first, stable traveling determination processing according to the present embodiment that is executed in step S7 of FIG. 7 will be described. FIG. 19 is a flowchart illustrating the procedures of first stable traveling determination according to the present embodiment.

In step S701, the ECU 6 performs differentiation regarding whether or not the steering wheel angular speed, calculated by time differentiation of the steering wheel angle by the steering angle sensor 97, is smaller than a threshold value for the steering wheel angular speed. The threshold value of the steering wheel angular speed in the first stable traveling determination is set to an appropriate value beforehand, as an index whereby the first stable traveling determination flag is set to "1" via the first stable traveling determination unit 65. In a case where this differentiation yields YES, the flow advances to step S702. If NO, the flow advances to step S709, the counter value is reset to "0", the flow advances to step S710, where the first stable traveling determination flag is set to "0", and thereafter the first stable traveling determination processing ends.

In step S702, the ECU 6 performs differentiation regarding whether or not a yaw rate G calculated by multiplying the yaw rate detected by the yaw rate sensor 98 by the vehicle speed detected by the vehicle speed sensor 96 is smaller than a yaw rate G threshold value. The threshold value for the yaw rate G in the first stable traveling determination is set to an appropriate value beforehand, as an index whereby the first stable traveling determination flag is set to "1" via the first stable traveling determination unit 65. In a case where this differentiation yields YES, the flow advances to step S703. If NO, the flow advances to step S709, the counter value is reset to "0", the flow advances to step S710, where the first stable traveling determination flag is set to "0", and thereafter the first stable traveling determination processing ends.

In step S703, the ECU 6 performs differentiation regarding whether or not the calculated lateral G is smaller than a lateral G threshold value. The lateral G compared with the threshold value is calculated from detection values of the lateral G sensor 95 and so forth. The threshold value for the lateral G in the first stable traveling determination is set to an appropriate value beforehand, as an index whereby the first stable traveling determination flag is set to "1" via the first stable traveling determination unit 65. In a case where this differentiation yields YES, the flow advances to step S704. If NO, the flow advances to step S709, the counter value is reset to "0", the flow advances to step S710, where the first stable traveling determination flag is set to "0", and thereafter the first stable traveling determination processing ends.

In step S704, the ECU 6 performs differentiation regarding whether or not the vehicle speed detected by the vehicle speed sensor 96 is larger than a lower limit threshold value for vehicle speed and is smaller than an upper limit vehicle speed threshold value. The upper limit threshold value and lower limit threshold value for the vehicle speed in the first stable traveling determination are set to appropriate values beforehand, as indices whereby the first stable traveling determination flag is set to "1" via the first stable traveling determination unit 65. In a case where this differentiation yields YES, the flow advances to step S705. If NO, the flow advances to step S709, the counter value is reset to "0", the flow advances to step S710, where the first stable traveling determination flag is set to "0", and thereafter the first stable traveling determination processing ends.

In step S705, the ECU 6 performs differentiation regarding whether or not the calculated fore-aft G is smaller than a fore-aft G threshold value. The fore-aft G to be compared with the threshold value is calculated from detection values of the fore-aft G sensor 99 and so forth. The threshold value for the fore-aft G in the first stable traveling determination is set to an appropriate value beforehand, as an index whereby the first stable traveling determination flag is set to "1" via the first stable traveling determination unit 65. In a case where this differentiation yields YES, the flow advances to step S706. If NO, the flow advances to step S709, the counter value is reset to "0", the flow advances to step S710, where the first stable traveling determination flag is set to "0", and thereafter the first stable traveling determination processing ends.

In step S706, the ECU 6 increments the counter value by 1.

In step S707, the ECU 6 performs differentiation regarding whether or not the counter value has exceeded a threshold value of the counter value. The threshold value for the counter value in the first stable traveling determination is set to an appropriate value beforehand, as an index whereby the first stable traveling determination flag is set to "1" via the first stable traveling determination unit 65. In a case where this differentiation yields YES, the flow advances to step S708, where the first stable traveling determination flag is set to "1", and thereafter the first stable traveling determination processing ends. In the processing in FIG. 19, while the counter value is reset in a case where comparison with the threshold value yields NO, the counter value is incremented by 1 in a case where comparison with all threshold values yields YES. That is to say, the counter value represents how many times a state in which the comparisons with all threshold values yields YES has continued. In other words, the present embodiment uses the counter value as an index showing of the duration of time over which the comparisons with all threshold values yields YES. If NO, the flow advances to step S710, where the first stable traveling determination flag is set to "0", and thereafter the first stable traveling determination processing ends.

Figure 20:
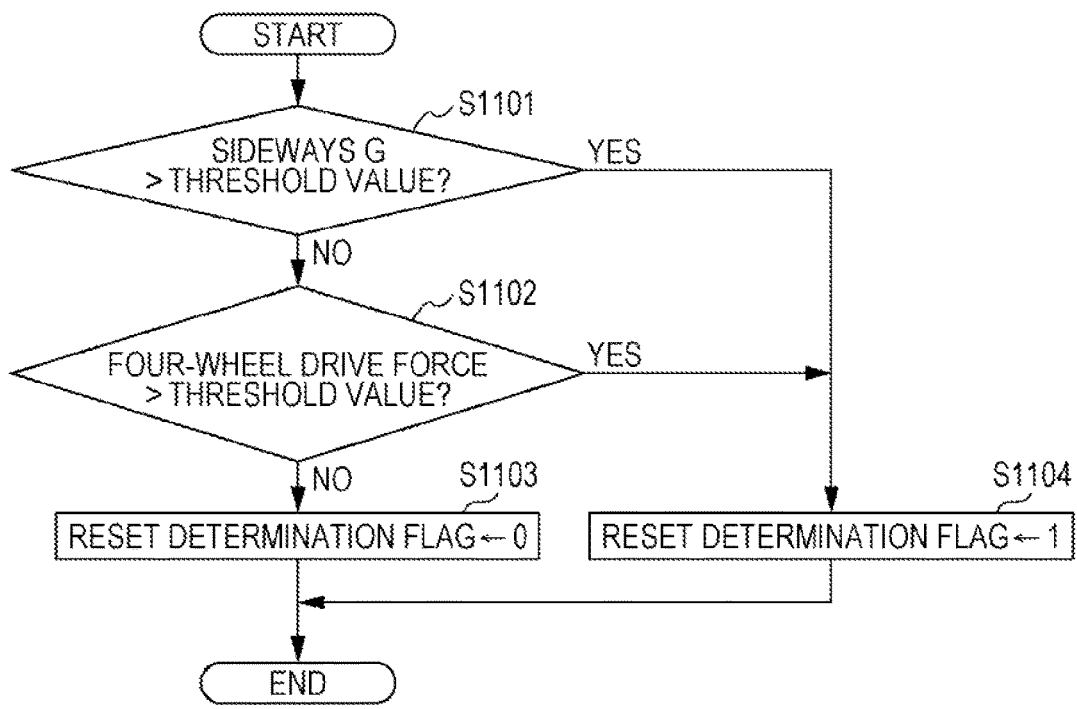
FIG. 20 is a flowchart illustrating procedures of reset determination according to the embodiment.

The reset determination processing according to the present embodiment that is executed in step S11 in FIG. 7 will be described next. FIG. 20 is a flowchart illustrating the procedures of reset determination according to the present embodiment.

In step S1101, the slip-AWD lateral G resetting unit 671 calculates lateral Gs on the vehicle 3, and performs differentiation of whether or not the calculated lateral G exceeds the lateral G threshold value in the reset determination. The lateral G to compare with the threshold value is calculated from detection values of the lateral G sensor 95 and so forth. Alternatively, the lateral G may be calculated from Expressions (1) and (2) shown in the description of the slip-AWD lateral G resetting unit 671. The threshold value for the lateral G in the reset determination is set to an appropriate value beforehand, as an index whereby the reset determination flag is set to "1" via the cumulative slip point resetting unit 67. In a case where this differentiation yields YES, the flow advances to step S1104 where the reset determination flag is set to "1", and thereafter the reset determination ends. If No, the flow advances to step S1102.

In step S1102, the slip-AWD drive force resetting unit 672 calculates the four-wheel drive force of the vehicle 3, and performs differentiation regarding whether or not the calculated four-wheel drive force exceeds the threshold value of the four-wheel drive force in the reset determination. Besides being detected by sensors, the four-wheel drive force to be compared with the threshold value is estimated based on the throttle opening detected by the throttle opening sensor 92, the engine revolutions detected by the engine revolutions sensor 93, motor currents or the like detected by the motor current sensors 94 provided to each of the electric motors 5, 2A, and 2B, for example, and thus acquired. The threshold value for the four-wheel drive force in the reset determination is set to an appropriate value beforehand, as an index whereby the reset determination flag is set to "1" via the cumulative slip point resetting unit 67. In a case where this differentiation yields YES, the flow advances to step S1104 where the reset determination flag is set to "1", and thereafter the reset determination ends. If No, the flow advances to step S1103 where the reset determination flag is set to "0", and thereafter the reset determination ends.

Figure 21:
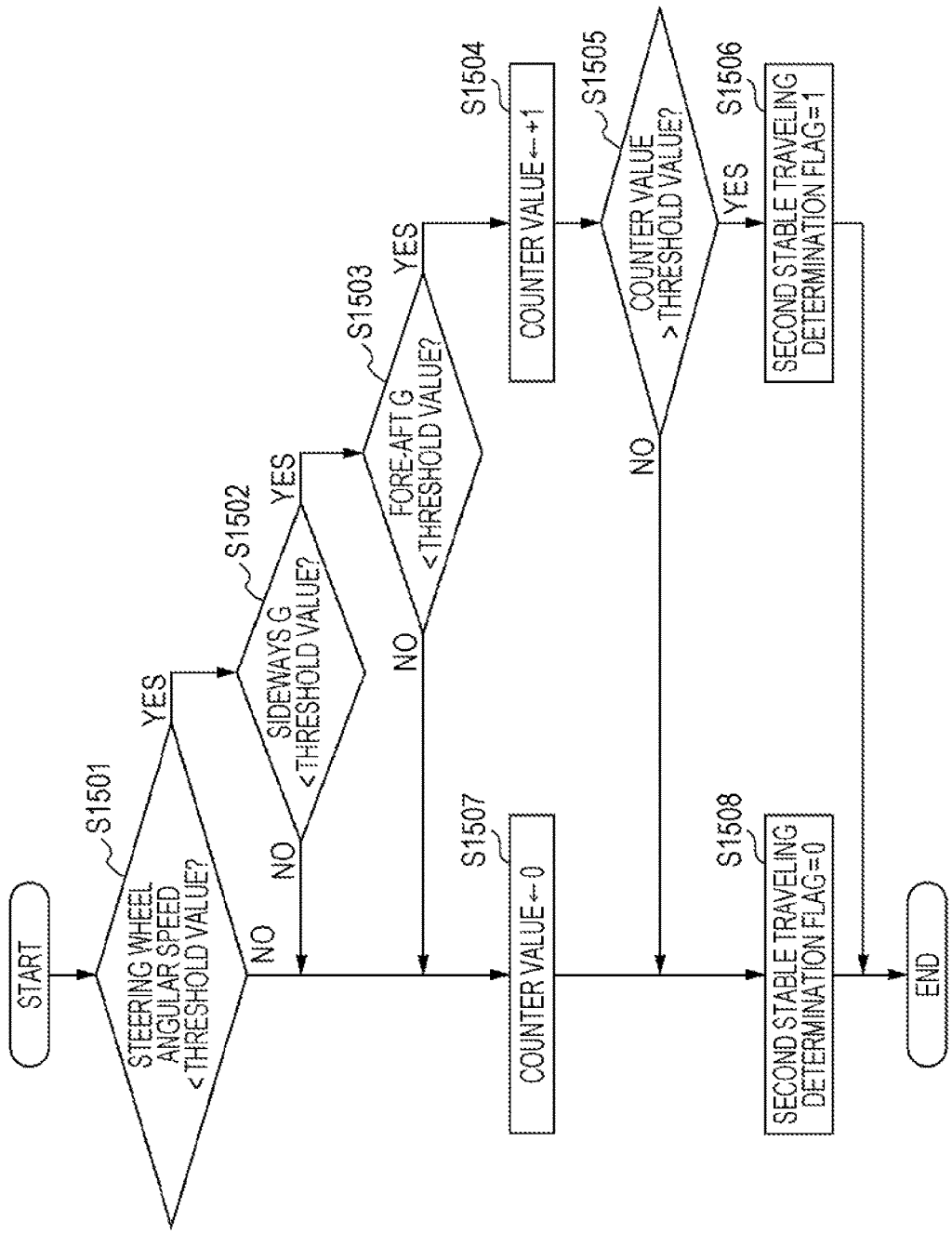
FIG. 21 is a flowchart illustrating procedures of second stable traveling determination according to the embodiment.

Next, the second stable traveling determination processing according to the present embodiment that is executed in step S15 in FIG. 7 will be described. FIG. 21 is a flowchart illustrating the procedures of the second stable traveling determination according to the present embodiment. Determination is made more readily that the vehicle 3 is traveling in a stable manner in the second stable traveling determination as compared to the first stable traveling determination. Specifically, a threshold value that needs to be underrun for determination to be made of a stable traveling state is higher in the second stable traveling determination as compared to the first stable traveling determination described above with reference to FIG. 19. Moreover, the second stable traveling determination has fewer determination items for determination to be made of a stable traveling state as compared to the above-described first stable traveling determination. The reason for this is that reset determination is performed prior to performing the second stable traveling determination in step S14, and it can be estimated that the vehicle 3 is not slipping and is traveling on a road with a high friction coefficient, so making it easier to cancel the slip AWD request is thought to be appropriate.

In step S1501, the ECU 6 performs differentiation regarding whether or not the steering wheel angular speed, calculated by time differentiation of the steering wheel angle by the steering angle sensor 97, is smaller than a threshold value for the steering wheel angular speed. The threshold value of the steering wheel angular speed in the second stable traveling determination is set to an appropriate value beforehand, as an index whereby the second stable traveling determination flag is set to "1" via the second stable traveling determination unit 66. In a case where this differentiation yields YES, the flow advances to step S1502. If NO, the flow advances to step S1507, the counter value is reset to "0", the flow advances to step S1508, where the second stable traveling determination flag is set to "0", and thereafter the second stable traveling determination processing ends.

In step S1502, the ECU 6 performs differentiation regarding whether or not the calculated lateral G is smaller than a lateral G threshold value. The lateral G compared with the threshold value is calculated from detection values of the lateral G sensor 95 and so forth. The threshold value for the lateral G in the second stable traveling determination is set to an appropriate value beforehand, as an index whereby the second stable traveling determination flag is set to "1" via the second stable traveling determination unit 66. In a case where this differentiation yields YES, the flow advances to step S1503. If NO, the flow advances to step S1507, the counter value is reset to "0", the flow advances to step S1508, where the second stable traveling determination flag is set to "0", and thereafter the second stable traveling determination processing ends.

In step S1503, the ECO 6 performs differentiation regarding whether or not the calculated fore-aft G is smaller than a fore-aft G threshold value. The fore-aft G to be compared with the threshold value is calculated from detection values of the fore-aft G sensor 99 and so forth. The threshold value for the fore-aft G in the second stable traveling determination is set to an appropriate value beforehand, as an index whereby the second stable traveling determination flag is set to "1" via the second stable traveling determination unit 66.

In a case where this differentiation yields YES, the flow advances to step S1504. If NO, the flow advances to step S1507, the counter value is reset to "0", the flow advances to step S1508, where the second stable traveling determination flag is set to "0", and thereafter the second stable traveling determination processing ends.

In step S1504, the EGO 6 increments the counter value by 1.

In step S1505, the ECU 6 performs differentiation regarding whether or not the counter value has exceeded a threshold value of the counter value. The threshold value for the counter value in the second stable traveling determination is set to an appropriate value beforehand, as an index whereby the second stable traveling determination flag is set to "1" via the second stable traveling determination unit 66. In a case where this differentiation yields YES, the flow advances to step S1506, where the second stable traveling determination flag is set to "1", and thereafter the second stable traveling determination processing ends. In the same way as in the first stable traveling determination processing in FIG. 19, the counter value is used as an index showing the duration of time over which the comparisons with ail threshold values yields YES. If NO, the flow advances to step S1508, where the second stable traveling determination flag is set to "0", and thereafter the second stable traveling determination processing ends.

Figure 22:
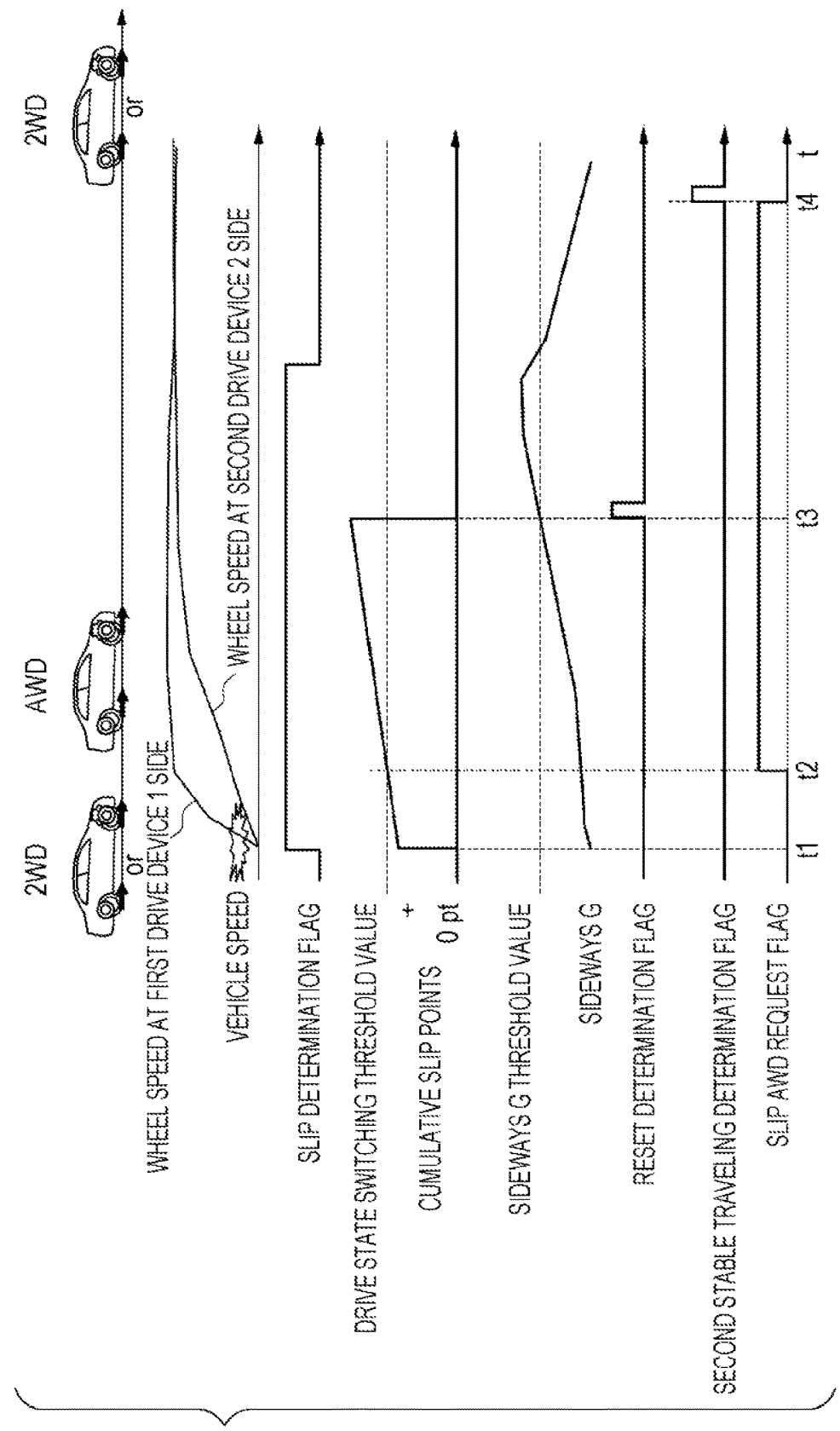
FIG. 22 is a time chart illustrating an example of drive state switching control according to the embodiment.

Next, an example of drive state switching control according to the present embodiment, where reset determination and second stable traveling determination are performed in particular, will be described. FIG. 22 is a time chart illustrating an example of drive state switching control according to the present embodiment. In FIG. 22, the line graph at the plus side of the "cumulative slip points" item represents the cumulative slip points.

First, at point-in-time t1 after a 2WD start, wheel speed difference has occurred between the wheel speeds of the front wheels Wf and rear wheels Wr (RWr, LWr) detected by the wheel speed sensor 91, so occurrence of slipping is acquired, and the slip determination flag is set to "1". In accordance with this, calculation of an addition slip point is started. Slipping is occurring at low drive force at this time (meaning that the addition slip point is large, as illustrated in FIG. 9), so the calculated value of the addition slip point is a large value. Accordingly, the cumulative slip points which is the cumulative value of addition slip points reaches the drive, state switching threshold value or higher at point-in-time t2, and accordingly the slip AWD request flag is set to "1" and switching to AWD is executed.

Calculation of addition slip points continues until the point-in-time that the slip determination flag is set to "0". Further, addition slip points having positive values, that have been calculated based on the slip-occurrence continuation time are accumulated from the point-in-time t1 up to the point-in-time that the slip determination flag is set to "0", so the cumulative slip points increase.

However, the lateral G exceeds the lateral G threshold value in point-in-time t3, so the reset determination flag is set to "1" in the reset determination. Accordingly, the value of cumulative slip points, which is the accumulated value of the addition slip points, is reset to zero. Further, second stable traveling determination is performed.

Thereafter, when the second stable traveling determination flag is set to "0" by the second stable traveling determination at point-in-time t4, the slip AWD request flag is correspondingly set to "0", and switching to 2WD is executed.

Figure 23:
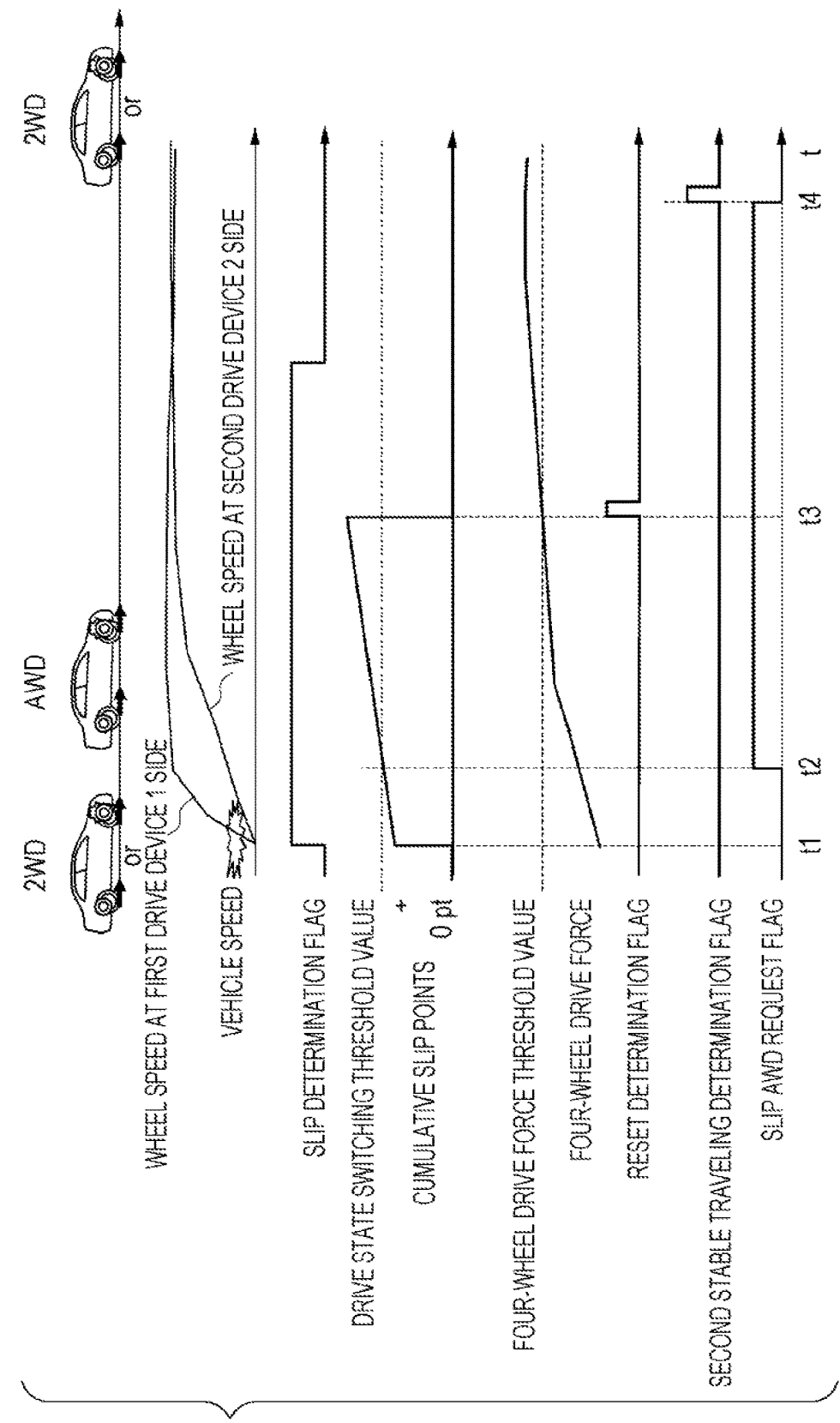
FIG. 23 is a time chart illustrating another example of drive state switching control according to the embodiment.

Next, an example of drive state switching control according to the present embodiment, where reset determination and second stable traveling determination are performed in particular, will further be described with reference to FIG. 23. FIG. 23 is a time chart illustrating another example of drive state switching control according to the present embodiment.

Although FIG. 23 is a diagram illustrating a situation that is almost the same as that in FIG. 22, the difference is that in FIG. 23, the reset determination flag is set to "1". Specifically, the lateral G exceeds the lateral G threshold value in point-in-time t3, so the reset determination flag is set to "1" in the reset determination, whereas in FIG. 23, the four-wheel drive force exceeds the four-wheel drive force threshold value, so the reset determination flag is set to "1" in the reset determination. Accordingly, the value of cumulative slip points, which is the accumulated value of the addition slip points, is reset to zero. Further, second stable traveling determination is performed. Other points are the same as those described with reference to FIG. 22, so redundant description will be omitted.

It can be seen from the description made with reference to FIGS. 22 and 23 that speedy switching to 2WD cars be performed by the reset determination or by the second stable traveling determination, even in cases where the cumulative slip point is not smaller than the drive state switching threshold value even of subtraction of subtraction slip points is performed, or in cases where the conditions of the first stable traveling determination are not satisfied.

The present embodiment yields the following advantages. According to the present embodiment, addition slip points are calculated based on the slip acquisition unit having acquired that an excessive slip has occurred. Switching is performed between 2WD and AWD based on cumulative slip points that are the accumulated value of the calculated addition slip points.

Also, in a case of having switched to AWD in this way, the cumulative slip points are reset to be smaller than the drive state switching threshold value in the present embodiment, based on acceleration correlation values having correlation with acceleration of the vehicle or drive force correlation values having correlation with drive force of the drive wheels.

With regard to this point, if lateral acceleration correlation values such as lateral Gs or drive force correlation values such as four-wheel drive force are high, there is a high likelihood that the friction coefficient is high, where the road is paved, the road surface is dry, and so forth. According to the present embodiment, the cumulative slip points are reset to be smaller than the drive state switching threshold value in such a case, so that switching to 2WD is more readily performed. Thus, a situation where AWD is needlessly continued for a long time even though the friction coefficient of the road is high and AWD is unnecessary, can be suppressed, thereby improving drive efficiency.

On the other hand, if lateral acceleration correlation values such as lateral Gs or drive force correlation values such as four-wheel drive force are low, there is a high likelihood that slipping is occurring with road conditions of low friction coefficient such as wet pavement or the like. According to the present embodiment, the cumulative slip points are not reset in such a case, so switching to 2WD is less readily performed. Thus, the drive state can be switched in accordance with the drive force of the drive wheel where slippage has occurred, so a situation where AWD is switched to 2WD even though the friction coefficient of the road is low and AWD is necessary, can be suppressed, thereby improving securing vehicle stability.

Subtraction slip points are calculated in a time-discrete manner, based on the slip acquisition unit having not acquired that an excessive slip has occurred, and subtraction slip points are accumulated in addition to addition slip points. Accordingly, in a case where the cumulative slip points exceed the drive state switching threshold value and thereafter are smaller than drive state switching threshold value, the drive state is switched to 2WD. Thus, traveling continues in AWD until configuration can be made that the excessive slipping has ended. In an arrangement where elapse of a certain amount of time from an excessive slip having occurred triggers switching from AWD to 2WD, the drive state is switched from AWD to 2WD even if in the middle of an excessive slip, but occurrence of such problems can be avoided by the present disclosure.

Also, in a case where the drive state is switched to AWD as described above, the conditions of switching to 2WD are relaxed to second conditions which are easier to satisfy than first conditions in the present embodiment, based on lateral acceleration correlation values having correlation with lateral acceleration of the vehicle or drive force correlation values having correlation with drive force of the drive wheels. Accordingly, multiple conditions are used, instead of switching to 2WD under certain conditions based on cumulative slip points as in a conventional arrangement, so the drive state of the vehicle 3 can be switched at a more appropriate timing.

For example, even in a case where the cumulative slip point exceeds a threshold value, if the lateral acceleration correlation values of lateral G or the like or drive force correlation values of four-wheel drive force or the like is high, there is a high likelihood that the road is paved or the road surface is dry and the friction coefficient is high. According to the present embodiment, second determination conditions that are more readily satisfied than first determination conditions are applied in such a case, so switching to 2WD takes place more readily. Accordingly, a situation where AWD is needlessly continued for a long time even though the friction coefficient of the road is high and AWD is unnecessary, can be suppressed, even further improving drive efficiency.

On the other hand, even in a case where the cumulative slip point exceeds a threshold value, if the lateral acceleration correlation values of lateral G or the like or drive force correlation values of four-wheel drive force or the like is low, there is a high likelihood that slipping is occurring where the road surface is wet or the like, and the friction coefficient is low. According to the present embodiment, in addition to conditions where the cumulative slip points are below the threshold value, first determination conditions that are less readily satisfied than second determination conditions are applied in such a case, so switching to 2WD takes place less readily. Accordingly, the drive state can be switched in accordance with the drive force of the drive wheel where the slippage has occurred, so a situation where switching from AWD to 2WD occurs even though the friction coefficient of the road is low is high and AWD is necessary, can be suppressed, even further securing vehicle stability.

Note that the present disclosure is not restricted to the above embodiment, and that modifications, improvements, and so forth within the range of the present disclosure are encompassed by the present disclosure. For example, the addition/subtraction slip point calculating unit 62 in the above embodiment may be replaced by an addition slip point calculating unit that does not calculate subtraction slip points and only calculates addition slip points. In this case, switching from 2WD to AWD is performed based on the cumulative slip points that are the cumulative value of the addition slip points, while switching from AWD to 2WD may be performed when a predetermined amount of time elapses, for example, regardless of points.

Although the drive source from the rear wheels has been described as being only the electric motors 2A and 2B in the above embodiment, the rear wheels may be driven by an internal combustion engine. Further, although the second drive device 2 for the rear wheels has been described as being two motors in the above embodiment, the electric motors 2A and 2B, one motor may foe used instead.

Although the slip-AWD drive force resetting unit 672 has been described as performing resetting based on four-wheel drive force in the above embodiment, resetting may be performed based on other references as well. For example, two-wheel drive force output from the rear wheels Wr (RWr, LWr) driven by the second drive device 2 may be used as a reference instead of four-wheel drive force. Also, drive force requested by the driver based on driver accelerator operations may be used as a reference.

What is claimed is:

1. A vehicle drive system comprising:
a first drive device configured to drive a first drive wheel, which is either a front wheel or a rear wheel of a vehicle;
a second drive device configured to drive a second drive wheel, which is the other of the front wheel or the rear wheel of the vehicle; and
a control device configured to control the first drive device and the second drive device to control a drive state of the first drive wheel and the second drive wheel,
wherein the control device comprises
a slip acquisition unit configured to detect that an excessive slip, which is slipping of the first drive wheel or the second drive wheel by a predetermined amount or more, is occurring,
an addition slip point calculating unit configured to calculate addition slip points in a time-discrete manner, based on the slip acquisition unit having acquired that the excessive slip has occurred,
a cumulative slip point calculating unit configured to accumulate the addition slip points and calculate a cumulative slip point over time,
a drive state switching unit configured to realize an in part-wheel drive state where the vehicle is driven by only one of the first drive wheel and the second drive wheel in a case where the cumulative slip point is smaller than a predetermined drive state switching threshold value, and to realize an all-wheel drive state where the vehicle is driven by both the first drive wheel and the second drive wheel in a case where the cumulative slip point is equal to or greater than the drive state switching threshold value, and
a cumulative slip point resetting unit configured to reset the cumulative slip point to a value smaller than the drive state switching threshold value, in a state where the drive state of the vehicle has been switched to the all-wheel drive state by the drive state switching unit, and a lateral acceleration correlation value having correlation to lateral acceleration of the vehicle reaches a lateral acceleration threshold value or higher.

2. A vehicle drive system comprising:
a first drive device configured to drive a first drive wheel, which is either a front wheel or a rear wheel of a vehicle;
a second drive device configured to drive a second drive wheel, which is the other of the front wheel or the rear wheel of the vehicle; and
a control device configured to control the first drive device and the second drive device, to controls a drive state of the first drive wheel and the second drive wheel,
wherein the control device comprises
a slip acquisition unit configured to detect that an excessive slip, which is slipping of the first drive wheel or the second drive wheel by a predetermined amount or more, is occurring,
an addition slip point calculating unit configured to calculate addition slip points in a time-discrete manner, based on the slip acquisition unit having acquired that the excessive slip has occurred,
a cumulative slip point calculating unit configured to accumulate the addition slip points and calculate a cumulative slip point over time,
a drive state switching unit configured to realize an in part-wheel drive state where the vehicle is driven by only one of the first drive wheel and the second drive wheel in a case where the cumulative slip point is smaller than a predetermined drive state switching threshold value, and to realize an all-wheel drive state where the vehicle is driven by both the first drive wheel and the second drive wheel in a case where the cumulative slip point is equal to or greater than the drive state switching threshold value, and
a cumulative slip point resetting unit configured to reset the cumulative slip point to a value smaller than the drive state switching threshold value, in a state where the drive state of the vehicle has been switched to the all-wheel drive state by the drive state switching unit, and a drive force correlation value having correlation to drive force of the drive wheel reaches a predetermined drive force correlation threshold value or higher.

3. A vehicle drive system comprising:
a first drive device configured to drive a first drive wheel, which is either a front wheel or a rear wheel of a vehicle;
a second drive device configured to drive second drive wheel, which is the other of the front wheel or the rear wheel of the vehicle; and
a control device configured to control the first drive device and the second drive device, to control a drive state of the first drive wheel and the second drive wheel,
wherein the control device comprises
a slip acquisition unit configured to detect that an excessive slip, which is slipping of the first drive wheel or the second drive wheel by a predetermined amount or more, is occurring,
an addition slip point calculating unit configured to calculate addition slip points in a time-discrete manner, based on the slip acquisition unit having acquired that the excessive slip has occurred,
a cumulative slip point calculating unit configured to accumulate the addition slip points and calculate a cumulative slip point over time,
a drive state switching unit configured to realize an in part-wheel drive state where the vehicle is driven by only one of the first drive wheel and the second drive wheel in a case where the cumulative slip point is smaller than a predetermined drive state switching threshold value, and to realize an all-wheel drive state where the vehicle is driven by both the first drive wheel and the second drive wheel in a case where the cumulative slip point is equal to or greater than the drive state switching threshold value, and a cumulative slip point resetting unit configured to reset the cumulative slip point to a value smaller than the drive state switching threshold value, in a state where the drive state of the vehicle has been switched to the all-wheel drive state by the drive state switching unit, and a lateral acceleration correlation value having correlation to lateral acceleration of the vehicle reaches a predetermined lateral acceleration threshold value or higher, or the drive force correlation value having correlation to drive force of the drive wheel reaches a drive force correlation threshold value or higher.

4. The vehicle drive system according to claim 1,
wherein the control device further comprises
a subtraction slip point calculating unit that calculates subtraction slip points in a time-discrete manner based on the slip acquisition unit having not acquired that excessive slip has occurred, and
wherein the cumulative slip point calculating unit accumulates the subtraction slip points in addition to the addition slip points.

5. The vehicle drive system according to claim 4, further comprising:
a first determination unit configured to, in a case where the cumulative slip point reaches the drive state switching threshold value or higher and thereafter the cumulative slip point becomes smaller than the drive state switching threshold value due to the subtraction slip points having been accumulated, determine whether or not first conditions, which are conditions for the drive state switching unit to realize the an in part-wheel drive state, have been satisfied; and
a second determination unit, in a case where the cumulative slip point reaches the drive state switching threshold value or higher and thereafter the cumulative slip point becomes smaller than the drive state switching threshold value due to resetting by the cumulative slip point resetting unit, determines whether or not second conditions, which are conditions for the drive state switching unit to realize the an in part-wheel drive state and are more readily satisfied than the first conditions, have been satisfied,
wherein the drive state switching unit switches the drive state to realizes an in part-wheel drive state in a case where the cumulative slip point is smaller than the drive state switching threshold value and the first conditions or second conditions are satisfied.

6. The vehicle drive system according to claim 5,
wherein the first determination unit and the second determination unit perform settings where the number of determination items for determination to be made that the second conditions are satisfied is smaller than the number of determination items for determination to be made that the first conditions are satisfied.

7. The vehicle drive system according to claim 5,
wherein the first determination unit and the second determination unit perform settings where
a first threshold value of a determination item for determination that conditions have been satisfied in a case where a value is the threshold value or higher is set where the threshold value for the first conditions is higher than the threshold value for the second conditions, and
a second threshold value for of a determination item determination that conditions have been satisfied in a case where a value is smaller than the threshold value is set where the threshold value for the first conditions is lower than the threshold value for the second conditions.

8. The vehicle drive system according to claim 1,
wherein, when the slip acquisition unit acquires that the excessive slip has occurred, the addition slip point calculating unit calculates the addition slip points based on a drive force correlation value having correlation with drive force of the drive wheel where the excessive slip has occurred.

9. The vehicle drive system according to claim 1,
wherein the cumulative slip point resetting unit performs the resetting not over time but instantaneously.

* * * * *